United States Patent
Huang et al.

(10) Patent No.: US 11,706,807 B2
(45) Date of Patent: Jul. 18, 2023

(54) RANDOM ACCESS METHOD, NETWORK DEVICE, AND TERMINAL

(71) Applicant: HUAWEI TECHNOLOGIES CO., LTD., Shenzhen (CN)

(72) Inventors: Huang Huang, Chengdu (CN); Mao Yan, Chengdu (CN); Kuandong Gao, Chengdu (CN); Hua Shao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/875,292

(22) Filed: May 15, 2020

(65) Prior Publication Data

US 2020/0281025 A1    Sep. 3, 2020

Related U.S. Application Data

(63) Continuation of application No. PCT/CN2018/110966, filed on Oct. 19, 2018.

(30) Foreign Application Priority Data

Nov. 17, 2017   (CN) .......................... 201711149118.0

(51) Int. Cl.
*H04W 74/08* (2009.01)
*H04W 74/02* (2009.01)
*H04W 74/00* (2009.01)

(52) U.S. Cl.
CPC ..... *H04W 74/0833* (2013.01); *H04W 74/006* (2013.01); *H04W 74/02* (2013.01)

(58) Field of Classification Search
CPC ............... H04W 74/006; H04W 74/02; H04W 74/0833
See application file for complete search history.

(56) References Cited

U.S. PATENT DOCUMENTS

| 10,383,150 B2 * | 8/2019 | Babaei | H04W 24/08 |
| 2019/0104544 A1 * | 4/2019 | Axnäs | H04W 74/004 |

(Continued)

FOREIGN PATENT DOCUMENTS

| CN | 101990311 A | 3/2011 |
| CN | 102271418 A | 12/2011 |

(Continued)

OTHER PUBLICATIONS

ZTE et al.,"WF on RACH association",3GPP TSG RAN WG1 Meeting #88 R1-1703630,Athens, Greece, Feb. 13-17, 2017,total 7 pages.

(Continued)

*Primary Examiner* — Liton Miah
(74) *Attorney, Agent, or Firm* — Hauptman Ham, LLP

(57) ABSTRACT

A random access method includes determining, by a network device, configuration information and sending the configuration information to a terminal. The configuration information indicates at least a quantity of random access preambles transmitted on one random access resource, a quantity of contention-based random access preambles transmitted on the one random access resource, a quantity of contention-free random access preambles transmitted on the one random access resource, the quantity of random access preambles associated with one downlink signal, the quantity of contention-free random access preambles associated with the one downlink signal, the quantity of contention-based random access preambles associated with the one downlink signal, or a quantity of transmitted downlink signals associated with the one random access resource.

20 Claims, 4 Drawing Sheets

(56) References Cited

U.S. PATENT DOCUMENTS

| | | | |
|---|---|---|---|
| 2020/0068616 A1* | 2/2020 | Qian | H04W 74/002 |
| 2020/0178306 A1* | 6/2020 | Ohara | H04L 5/0048 |
| 2020/0351853 A1* | 11/2020 | Xiong | H04L 5/0023 |

FOREIGN PATENT DOCUMENTS

| | | |
|---|---|---|
| CN | 106941730 A | 7/2017 |
| CN | 107006037 A | 8/2017 |
| CN | 107211466 A | 9/2017 |
| CN | 107277897 A | 10/2017 |
| WO | 2015119555 A1 | 8/2015 |

OTHER PUBLICATIONS

Huawei et al.,"WF on RACH association",3GPP TSG RAN WG1 Meeting #88bis R1-1706782,Spokane, USA, Apr. 3-7, 2017,total 3 pages.

International Search Report issued in corresponding International Application No. PCT/CN2018/110966, dated Jan. 11, 2019, State Intellectual Property Office of the P.R. China, Beijing, China.

Huawei, HiSilicon, RACH Procedures and Resource Configuration. 3GPP TSG RAN WG1 Meeting #89, Hangzhou, China, May 15-19, 2017, R1-1706976, 7 pages.

Ericsson, NR-RACH preamble format details for capacity enhancement and beam management. 3GPP TSG RAN WG1 Meeting #90, Prague, Czech Republic, Aug. 21-25, 2017, R1-1714041, 7 pages.

Ericsson, 4-step random access procedure. 3GPP TSG RAN WG1 Meeting #90, Prague, Czech Republic, Aug. 21-25, 2017, R1-1714043, 16 pages.

Nokia, Nokia Shanghai Bell, Remaining details on PRACH procedure. 3GPP TSG RAN WG1 Meeting 90bis, Prague, Czech Republic, Oct. 9-13, 2017, R1-1718303, 9 pages.

Extended European Search Report issued in corresponding European Application No. 18878496.1, dated Oct. 12, 2020, pp. 1-12, European Patent Office, Munich, Germany.

3GPP TSG RAN WG1 meeting #54bis R1-083620 Enumerate random access resources within radio frame and Draft CR for 36.211, CATT, total 11 pages.

Chinese Office Action issued in corresponding Chinese Application No. 201711149118.0, dated Mar. 24, 2023, pp. 1-10.

* cited by examiner

RANDOM ACCESS METHOD, NETWORK DEVICE, AND TERMINAL

CROSS-REFERENCE TO RELATED APPLICATIONS

This application is a continuation of International Application No. PCT/CN2018/110966, filed on Oct. 19, 2018 which claims priority to Chinese Patent Application No. 201711149118.0, filed on Nov. 17, 2017, the disclosures of the aforementioned applications are hereby incorporated by reference in their entireties.

TECHNICAL FIELD

This application relates to wireless communications technologies, and in particular, to a random access method, a network device, and a terminal.

BACKGROUND

Mobile service development poses an increasingly high requirement on a data rate and efficiency in wireless communication. In a future wireless communications system, a beamforming technology is used to limit energy of a transmitted signal to a specific beam direction, to improve signal reception efficiency. Specifically, the beamforming technology can effectively expand a transmission range of a radio signal, and reduce signal interference, so as to achieve higher communication efficiency and obtain a larger network capacity. However, the beamforming technology brings challenges to a system design when improving efficiency in a wireless communications network. A plurality of beams implement full-range coverage, to limit the energy of the transmitted signal to a specific area. In addition, terminals located in different geographical locations have different quantities, load, service requirements, and the like, and therefore, different areas require different quantities of beams and resources. Further, a transmit beam matches a receive beam, so that the receive beam obtains a signal with relatively good signal quality from the transmit beam.

Currently, in a multi-beam network, the foregoing challenges are overcome by using a beam scanning technology. Due to a limitation of a capability of a base station, beam scanning is performed in a time division manner. To be specific, the base station sends or receives signals on a plurality of beams at different times. Therefore, before communication between the base station and a terminal, uplink synchronization and downlink synchronization are performed. In a downlink synchronization process, the base station sends a downlink synchronization signal by using a plurality of transmit beams, and the terminal receives and detects the downlink synchronization signal by using one or more receive beams, and determines an optimal pair of downlink transmit beam and receive beam, a downlink time, and system information. The uplink synchronization is completed by using a random access process. The terminal first sends a random access signal, and the base station detects the random access signal, to obtain an optimal pair of uplink transmit beam and receive beam, an uplink time, and the like, and implement uplink synchronization between the base station and the terminal.

In a current new radio (NR) technology, there is no suitable manner for determining a random access resource. Therefore, the terminal blindly attempts to use a random access resource when sending the random access signal, and a beam mismatch may occur when the base station receives the random access signal, resulting in a relatively low random access efficiency.

SUMMARY

This application provides a random access method, a network device, and a terminal, to indicate related information in a random access process.

According to some embodiments, this application provides a random access method, including:

determining, by a network device, configuration information, where the configuration information is used to indicate at least one of the following: a quantity of random access preambles transmitted on one random access resource, a quantity of contention-based random access preambles transmitted on one random access resource, a quantity of contention-free random access preambles transmitted on one random access resource, a quantity of random access preambles associated with one downlink signal, a quantity of contention-free random access preambles associated with one downlink signal, a quantity of contention-based random access preambles associated with one downlink signal, and a quantity of actually transmitted downlink signals associated with one random access resource; and sending, by the network device, the configuration information to a terminal.

In some embodiments, the quantity of actually transmitted downlink signals associated with one random access resource is determined based on an actually transmitted downlink signal and/or an actually transmitted downlink signal group.

In some embodiments, when the configuration information indicates the quantity of actually transmitted downlink signals associated with one random access resource, the configuration information includes an index of the quantity of actually transmitted downlink signals associated with one random access resource.

In some embodiments, the method further includes:

determining, by the network device based on a quantity of actually transmitted downlink signals, a quantity of bits occupied by the index of the quantity of actually transmitted downlink signals associated with one random access resource.

In some embodiments, the method further includes:

determining, by the network device based on the quantity of random access preambles transmitted on one random access resource, a quantity of bits in the configuration information that are occupied by an index of the quantity of contention-based random access preambles transmitted on one random access resource.

In some embodiments, the method further includes:

determining, by the network device based on the quantity of actually transmitted downlink signals associated with one random access resource, a quantity of bits in the configuration information that are occupied by an index of the quantity of random access preambles associated with one downlink signal.

In some embodiments, indexes of the random access preambles associated with one downlink signal are inconsecutive or consecutive random access preamble indexes.

In some embodiments, the configuration information is specifically used to indicate: the quantity of random access preambles transmitted on one random access resource, the quantity of contention-free random access preambles associated with one downlink signal, and the quantity of actually transmitted downlink signals associated with one random access resource; or the quantity of contention-free random access preambles associated with one downlink signal, and the quantity of actually transmitted downlink signals associated with one random access resource.

According to some embodiments, this application provides a random access method, including:

receiving, by a terminal, configuration information sent by a network device, where the configuration information is used to indicate at least one of the following: a quantity of random access preambles transmitted on one random access resource, a quantity of contention-based random access preambles transmitted on one random access resource, a quantity of contention-free random access preambles transmitted on one random access resource, a quantity of random access preambles associated with one downlink signal, a quantity of contention-free random access preambles associated with one downlink signal, a quantity of contention-based random access preambles associated with one downlink signal, and a quantity of actually transmitted downlink signals associated with one random access resource;

determining, by the terminal based on the configuration information, a random access resource associated with an actually transmitted downlink signal; and sending, by the terminal, a random access preamble to the network device based on the random access resource associated with the actually transmitted downlink signal.

In some embodiments, the quantity of actually transmitted downlink signals associated with one random access resource is determined based on an actually transmitted downlink signal and/or an actually transmitted downlink signal group.

In some embodiments, when the configuration information indicates the quantity of actually transmitted downlink signals associated with one random access resource, the configuration information includes an index of the quantity of actually transmitted downlink signals associated with one random access resource.

In some embodiments, a quantity of bits in the configuration information that are occupied by an index of the quantity of random access preambles associated with one downlink signal is determined based on the quantity of actually transmitted downlink signals associated with one random access resource.

In some embodiments, indexes of the random access preambles associated with one downlink signal are inconsecutive random access preamble indexes.

In some embodiments, the configuration information is specifically used to indicate: the quantity of random access preambles transmitted on one random access resource, the quantity of contention-free random access preambles associated with one downlink signal, and the quantity of actually transmitted downlink signals associated with one random access resource; or the quantity of contention-free random access preambles associated with one downlink signal, and the quantity of actually transmitted downlink signals associated with one random access resource.

According to some embodiments, this application provides a network device. The network device includes a module or a means for performing the method provided in some embodiments and the implementations of the first aspect.

According to some embodiments, this application provides a terminal. The terminal includes a module or a means for performing the method provided in some embodiments and the implementations of some embodiments.

According to some embodiments, this application provides an apparatus. The apparatus includes a processor and a memory. The memory is configured to store a program. The processor invokes the program stored in the memory, to perform the method provided in some embodiments of this application. The apparatus may be a network device, or may be a chip on a network device.

According to some embodiments, this application provides an apparatus. The apparatus includes a processor and a memory. The memory is configured to store a program. The processor invokes the program stored in the memory, to perform the method provided in some embodiments of this application. The apparatus may be a terminal, or may be a chip on a terminal device.

According to some embodiments, this application provides a computer storage medium, the computer storage medium is configured to store a program, and the program is used to perform any method according to some embodiments.

In the random access method, the terminal, and the network device provided in this application, the network device determines the configuration information, and sends the configuration information to the terminal. The configuration information indicates at least one of the following: the quantity of random access preambles transmitted on one random access resource, the quantity of contention-based random access preambles transmitted on one random access resource, the quantity of contention-free random access preambles transmitted on one random access resource, the quantity of random access preambles associated with one downlink signal, the quantity of contention-free random access preambles associated with one downlink signal, the quantity of contention-based random access preambles associated with one downlink signal, and the quantity of actually transmitted downlink signals associated with one random access resource. In this way, the terminal sends the random access preamble based on the configuration information. The network device indicates related information about random access to the terminal, to complete a random access process.

DESCRIPTION OF EMBODIMENTS

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. In this application, some symbols are described as follows: "Mod" represents modulo, "floor" represents rounding down, and "ceil" represents rounding up.

Embodiments of this application may be applied to a wireless communications system. It should be noted that the wireless communications system mentioned in the embodiments of this application includes but is not limited to: a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and three major application scenarios of a next-generation 5G mobile communications system, namely, enhanced mobile broadband (eMBB), URLLC, and massive machine-type communications (mMTC).

In the embodiments of this application, a terminal includes but is not limited to a mobile station (MS), a mobile terminal, a mobile telephone, a handset, portable equipment, and the like. The terminal may communicate with one or more core networks by using a radio access network (RAN). For example, the terminal may be a mobile telephone (or referred to as a "cellular" telephone), or a computer having a wireless communication function. Alternatively, the terminal may be a portable, pocket-sized, handheld, computer built-in, or in-vehicle mobile apparatus or device.

Figure 1:
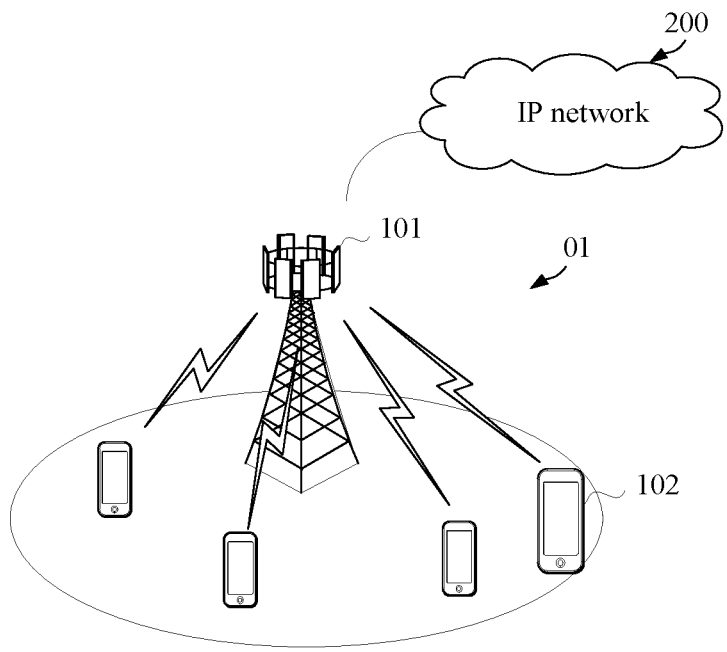
FIG. 1 is a schematic architectural diagram of a communications system according to some embodiments of this application.

FIG. 1 is a schematic architectural diagram of a communications system according to this application.

As shown in FIG. 1, a communications system 01 includes a network device 101 and a terminal 102. When the communications system 01 includes a core network, the network device 101 may be further connected to the core network. The network device 101 may further communicate with an internet protocol (IP) network 200, for example, the internet, a private IP network, or another data network. A network device provides a service for a terminal in a coverage area of the network device. For example, referring to FIG. 1, the network device 101 provides wireless access for one or more terminals within a coverage area of the network device 101. In addition, network devices may further communicate with each other.

The network device 101 may be a device configured to communicate with the terminal. For example, the network device 101 may be a base transceiver station (BTS) in a GSM system or CDMA system, or may be a NodeB (NB) in a WCDMA system, or may be an evolved NodeB (eNB or eNodeB) in an LTE system or a network-side device in a future 5G network. Alternatively, the network device may be a relay station, an access point, a vehicle-mounted device, or the like. In a device-to-device (D2D) communications system, the network device may be a terminal that acts a function of a base station. The terminal may include various types of handheld devices having a wireless communication function, a vehicle-mounted device, a wearable device, a computing device, another processing device connected to a wireless modem, user equipment (UE) in various forms, a mobile station (MS), and the like.

In this application, a downlink signal may refer to a synchronization signal block (SS block). The SS block may correspond to one or more OFDM symbols. The SS block includes at least one of the following: a primary synchronization signal (PSS), a secondary synchronization signal (SSS), a physical broadcast channel signal (PBCH), and a demodulation reference signal (DMRS). The SS block may also be referred to as an SS/PBCH block. Signals in the SS block or the SS/PBCH block may be on a same antenna port.

In some embodiments, the downlink signal may alternatively be at least one of a channel state information-reference signal (CSI-RS) and a CSI-RS resource index. This is not limited in this application.

A plurality of downlink signals may form one downlink signal group. In some embodiments, one downlink signal group may include a maximum of eight downlink signals. For example, one SS block group may include a maximum of eight SS blocks.

This application provides a new random access method to address the foregoing technical problem.

In this application, an index number of the downlink signal may be edited in a plurality of manners, which may be preconfigured based on a specific requirement.

(1) All actually transmitted downlink signals are uniformly numbered with index numbers. In other words, the transmitted downlink signals are not divided into downlink signal groups. For example, if 49 downlink signals are actually transmitted, index numbers are 0 to 48, 1 to 49, or the like.

(2) Downlink signals in each actually transmitted downlink signal group are separately numbered with index numbers. Specifically, the actually transmitted downlink signal groups are first numbered with index numbers. For example, there are a total of eight actually transmitted downlink signal groups whose index numbers are 0 to 7, 1 to 8, or the like. It is assumed that in an actually transmitted downlink signal group, there are eight actually transmitted downlink signals whose index numbers are 0 to 7, 1 to 8, or the like. In another actually transmitted downlink signal group, there are also eight actually transmitted downlink signals whose index numbers are 0 to 7, 1 to 8, or the like.

It should be noted that quantities of actually transmitted downlink signals in all the actually transmitted downlink signal groups may be the same or may be different. This is not limited in this application.

(3) All downlink signals are uniformly numbered with index numbers. The downlink signals are not divided into groups, and whether the signals are actually transmitted is not taken into consideration. For example, there are a total of 64 downlink signals that may be transmitted, and index numbers are 0 to 63, 1 to 64, or the like.

(4) All downlink signal groups are numbered with index numbers. For example, there are a total of eight downlink signal groups that may be transmitted, and index numbers are 0 to 7, 1 to 8, or the like. Then, all downlink signals that may be transmitted in each downlink signal group are numbered with index numbers. For example, one downlink signal group includes eight downlink signals whose index numbers are 0 to 7, 1 to 8, or the like.

It should be noted that quantities of downlink signals in all the downlink signal groups may be the same or may be different. This is not limited in this application.

Figure 2:
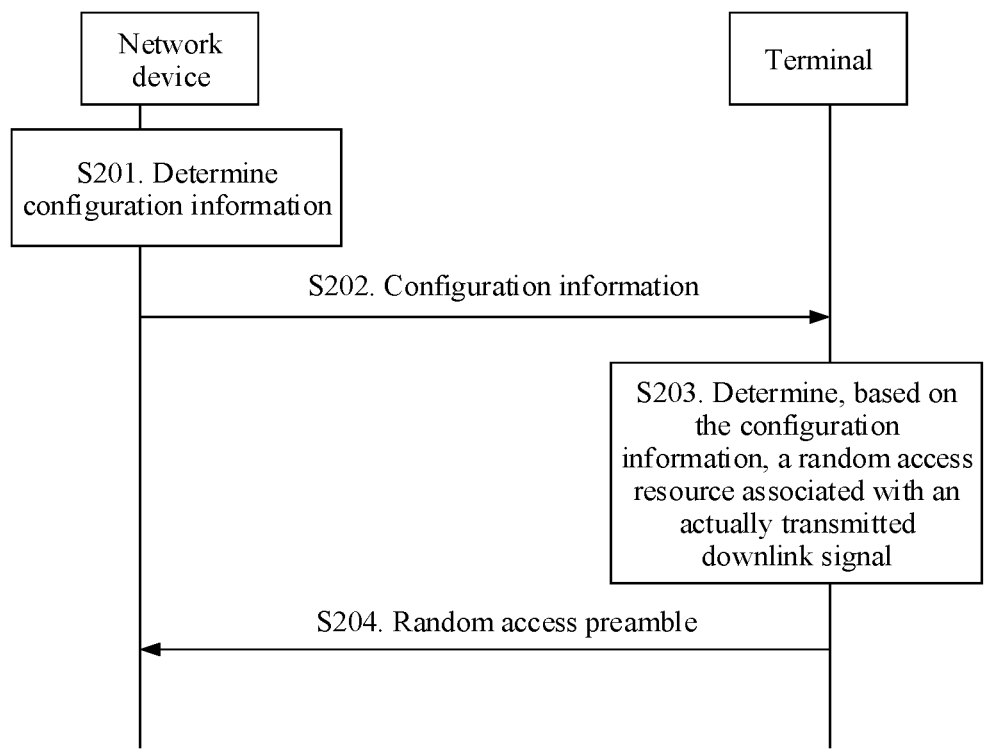
FIG. 2 is a schematic flowchart of a random access method according to some embodiments of this application.

FIG. 2 is a schematic flowchart of a random access method according to an embodiment of this application. As shown in FIG. 2, the method includes the following steps.

S201. A network device determines configuration information. The configuration information is used to indicate at least one of the following: a quantity of random access preambles transmitted on one random access resource, a quantity of contention-based random access (CBRA) preambles transmitted on one random access resource, a quantity of contention-free random access (CFRA) preambles transmitted on one random access resource, a quantity of random access preambles associated with one downlink signal, a quantity of contention-free random access preambles associated with one downlink signal, a quantity of contention-based random access preambles associated with one downlink signal, and a quantity of actually transmitted downlink signals associated with one random access resource.

The configuration information may include a plurality of bits. In the foregoing information, each piece of information that is indicated is represented by a value of one or more bits.

The configuration information may include any combination of the foregoing information.

In some embodiments, in an implementation, the configuration information specifically indicates the quantity of random access preambles transmitted on one random access resource, the quantity of contention-free random access preambles associated with one downlink signal, and the quantity of actually transmitted downlink signals associated with one random access resource.

A terminal may deduce, based on the several pieces of information indicated by the configuration information, the quantity of contention-based random access preambles associated with one downlink signal.

Alternatively, in another implementation, the configuration information specifically indicates the quantity of contention-free random access preambles associated with one downlink signal and the quantity of actually transmitted downlink signals associated with one random access resource.

Certainly, the combination manners in this application are not limited to the foregoing two manners.

In a specific implementation process, the downlink signal may be understood as an actually transmitted downlink signal. In an extensible manner, all downlink signals mentioned in this application may be understood as actually transmitted downlink signals.

S202. The network device sends the configuration information to the terminal.

S203. The terminal determines, based on the configuration information, a random access resource associated with an actually transmitted downlink signal.

S204. The terminal sends a random access preamble to the network device based on the random access resource associated with the actually transmitted downlink signal.

The random access preamble sent to the network device herein may include a contention-based random access preamble and/or a contention-free random access preamble, and may be specifically determined based on an implementation scenario. This is not limited herein.

The network device configures related information about a random access resource, a random access preamble, and a downlink signal for the terminal by using the configuration information, so that the terminal may determine, based on the configuration information, an association relationship between an actually transmitted downlink signal and a random access resource, and a random access preamble transmitted on the random access resource, and send the random access preamble to the network device.

In this embodiment, the network device determines the configuration information, and sends the configuration information to the terminal. The configuration information indicates at least one of the following: the quantity of random access preambles transmitted on one random access resource, the quantity of contention-based random access preambles transmitted on one random access resource, the quantity of contention-free random access preambles transmitted on one random access resource, the quantity of random access preambles associated with one downlink signal, the quantity of contention-free random access preambles associated with one downlink signal, the quantity of contention-based random access preambles associated with one downlink signal, and the quantity of actually transmitted downlink signals associated with one random access resource. In this way, the terminal sends the random access preamble based on the configuration information. The network device indicates related information about random access to the terminal, to complete a random access process.

In this application, the random access (RA) resource may include a random access time, frequency, and the like. The random access time may be an orthogonal frequency division multiplexing (OFDM) symbol, a mini-slot, a slot, a subframe, or a time period of H basic time units that represents a time for sending a predefined random access preamble, where H is greater than 0. The random access frequency represents a bandwidth for sending a predefined random access preamble. In an implementation, one random access resource is identified by two dimensions: the random access time and the random access frequency. In other words, one random access resource is defined by using one random access time and one random access frequency. In another implementation, a plurality of random access resources may be defined by using one random access time and one random access frequency.

A random access resource may also be referred to as a random access occasion (RACH occasion/RACH transmission occasion/RACH opportunity/RACH chance, RO), or a random access preamble of one or more sets on a random access time-frequency resource.

Based on the foregoing embodiment, the quantity of actually transmitted downlink signals associated with one random access resource is determined based on an actually transmitted downlink signal and/or an actually transmitted downlink signal group.

Further, when the configuration information indicates the quantity of actually transmitted downlink signals associated with one random access resource, the configuration information includes an index of the quantity of actually transmitted downlink signals associated with one random access resource.

It should be noted that there are a plurality of cases of the quantity of actually transmitted downlink signals associated with one random access resource, and there may be one index in each case. The index may be indicated by a corresponding bit in the configuration information.

In some embodiments, when the configuration information indicates the quantity of actually transmitted downlink signals associated with one random access resource, there are a plurality of indication methods.

In a method, a quantity of actually transmitted downlink signal groups associated with one random access resource is indicated, and the quantity of actually transmitted downlink signals associated with one random access resource is indicated with reference to a quantity of actually transmitted downlink signals in the downlink signal groups. If the quantity of actually transmitted downlink signals in the actually transmitted downlink signal groups is X, and the quantity of actually transmitted downlink signal groups is Y, a quantity of bits occupied by the index of the quantity of actually transmitted downlink signals associated with one random access resource may be min(4, ceil(log 2(X+Y))) or min(4, ceil(log 2(X+Y−1))). X and Y are integers greater than 0.

Alternatively, a quantity Z of contention-based random access preambles transmitted on one random access resource is used to indicate the quantity of actually transmitted downlink signals associated with one random access resource. Z is an integer greater than 0. A quantity of bits occupied by the index of the quantity of actually transmitted downlink signals associated with one random access resource may be min(4, ceil(log 2(Z))). ceil represents rounding up, and min represents taking a smaller value. When transmission is performed based on a downlink signal group, a quantity of actually transmitted downlink signals is X*Y, where * represents multiplication.

Further, a frequency band may be further considered to determine the configuration information. For example, when the frequency band is higher than 6 GHz, if the quantity of actually transmitted downlink signals in the actually transmitted downlink signal groups is X, and the quantity of actually transmitted downlink signal groups is Y, a quantity of bits occupied by the index of the quantity of actually transmitted downlink signals associated with one random access resource may be min(4, ceil(log 2(X+Y))) or min(4, ceil(log 2(X+Y−1))). X and Y are integers greater than 0.

Alternatively, when the frequency band is higher than 6 GHz, a quantity Z of contention-based random access preambles transmitted on one random access resource is used to indicate the quantity of actually transmitted downlink signals associated with one random access resource. Z is an integer greater than 0. A quantity of bits occupied by the index of the quantity of actually transmitted downlink signals associated with one random access resource may be min(4, ceil(log 2(Z))).

Alternatively, X, Y, and Z are all considered, and a quantity of bits occupied by the index of the quantity of actually transmitted downlink signals associated with one random access resource may be any one of the following: min(4, ceil(log 2(X+Y)), ceil(log 2(Z))), min(4, ceil(log 2(X+Y−1)), or ceil(log 2(Z))).

As shown in Table 1, different indexes indicate different quantities of actually transmitted downlink signals associated with one random access resource. 16 cases in Table 1 include an association relationship between a downlink signal group and a random access resource, and also include an association relationship between an actually transmitted downlink signal and a random access resource.

TABLE 1

| Index | Meaning | |
|---|---|---|
| 0 | One actually transmitted downlink signal is associated with one random access resource. | Actually transmitted downlink signals may be included in consecutive or inconsecutive groups. |
| 1 | Two actually transmitted downlink signals are associated with one random access resource. | |
| 2 | Three actually transmitted downlink signals are associated with one random access resource. | |
| 3 | Four actually transmitted downlink signals are associated with one random access resource. | |

TABLE 1-continued

| Index | Meaning | |
|---|---|---|
| 4 | Five actually transmitted downlink signals are associated with one random access resource. | |
| 5 | Six actually transmitted downlink signals are associated with one random access resource. | |
| 6 | Seven actually transmitted downlink signals are associated with one random access resource. | |
| 7 | Eight actually transmitted downlink signals are associated with one random access resource. | |
| 8 | Two actually transmitted downlink signals are associated with one random access resource. | An actually transmitted downlink signal group may include consecutive or inconsecutive downlink signals. |
| 9 | Three actually transmitted downlink signals are associated with one random access resource. | |
| 10 | Four actually transmitted downlink signals are associated with one random access resource. | |
| 11 | Five actually transmitted downlink signals are associated with one random access resource. | |
| 12 | Six actually transmitted downlink signals are associated with one random access resource. | |
| 13 | Seven actually transmitted downlink signals are associated with one random access resource. | |
| 14 | Eight actually transmitted downlink signals are associated with one random access resource. | |
| 15 | Reserved | |

Based on the foregoing embodiment, when the frequency band is lower than or equal to 6 GHz, if a quantity of actually transmitted downlink signals is Y', a quantity of bits occupied by the index of the quantity of actually transmitted downlink signals associated with one random access resource may be min(3, log 2(Y')). Y' is an integer greater than 0.

Alternatively, when the frequency band is lower than or equal to 6 GHz, a quantity Z of contention-based random access preambles transmitted on one random access resource is used to indicate the quantity of actually transmitted downlink signals associated with one random access resource. Z is an integer greater than 0. A quantity of bits occupied by the index of the quantity of actually transmitted downlink signals associated with one random access resource may be min(3, ceil(log 2(Y')), ceil(log 2(Z))).

Based on the foregoing embodiment, when the frequency band is lower than or equal to 3 GHz, if a quantity of actually transmitted downlink signals is Y', a quantity of bits occupied by the index of the quantity of actually transmitted downlink signals associated with one random access resource may be min(2, log 2(Y')). Y' is an integer greater than 0.

Alternatively, when the frequency band is lower than or equal to 3 GHz, a quantity Z of contention-based random access preambles transmitted on one random access resource is used to indicate the quantity of actually transmitted downlink signals associated with one random access resource. Z is an integer greater than 0. A quantity of bits occupied by the index of the quantity of actually transmitted downlink signals associated with one random access resource may be min(2, ceil(log 2(Y')), ceil(log 2(Z))).

In some embodiments, the quantity of actually transmitted downlink signals associated with one random access resource may be alternatively determined based on a quantity of actually transmitted downlink signal groups associated with one random access resource. As shown in Table 2, different indexes indicate different quantities of actually transmitted downlink signal groups associated with one random access resource. In this way, an index quantity can be reduced, so that bits used for indication in the configuration information can be reduced, to save a resource.

During specific implementation, the index quantity may be determined based on the quantity of actually transmitted downlink signals. For example, if there are only four actually transmitted downlink signals, only some data indexes such as 0 to 4 in Table 2 may be retained. In this way, the index quantity can be reduced, so that the bits used for indication in the configuration information can be reduced, to save the resource.

TABLE 2

| Index | Meaning | |
|---|---|---|
| 0 | One actually transmitted downlink signal is associated with one random access resource. | Actually transmitted downlink signals may be included in consecutive or inconsecutive groups. |
| 1 | Two actually transmitted downlink signals are associated with one random access resource. | |
| 2 | Three actually transmitted downlink signals are associated with one random access resource. | |
| 3 | Four actually transmitted downlink signals are associated with one random access resource. | |
| 4 | Five actually transmitted downlink signals are associated with one random access resource. | |
| 5 | Six actually transmitted downlink signals are associated with one random access resource. | |
| 6 | Seven actually transmitted downlink signals are associated with one random access resource. | |
| 7 | Eight actually transmitted downlink signals are associated with one random access resource. | |

It should be noted that a relationship between the foregoing index and the following meaning is merely an example for description, and may be specifically configured during specific implementation. This is not limited in this application.

It should be noted that a sum of the quantity of contention-based random access preambles and the quantity of contention-free random access preambles in one random access resource may be fixed at any one of 64, 128, and 256.

The sum of the quantity of contention-based random access preambles and the quantity of contention-free random access preambles in one random access resource may also be configured by using the foregoing configuration information, for example, may be configured as any one of 64, 128, and 256, or may be configured as any one of 64 and 128 and indicated by using 1 bit, or may be configured as any one of 64 and 256 and indicated by using 1 bit, or may be configured as any one of 128 and 256 and indicated by using 1 bit.

For example, when the frequency band is lower than or equal to 3 GHz, the sum of the quantity of contention-based random access preambles and the quantity of contention-free random access preambles in one random access resource is configured as 64; when the frequency band is higher than 3 GHz and is lower than or equal to 6 GHz, the sum of the quantity of contention-based random access preambles and the quantity of contention-free random access preambles in one random access resource is configured as 128; or when the frequency band is higher than 6 GHz, the sum of the quantity of contention-based random access preambles and the quantity of contention-free random access preambles in one random access resource is configured as 256.

For another example, when the frequency band is lower than or equal to 6 GHz, the sum of the quantity of contention-based random access preambles and the quantity of contention-free random access preambles in one random access resource is configured as 64; or when the frequency band is higher than 6 GHz, the sum of the quantity of contention-based random access preambles and the quantity of contention-free random access preambles in one random access resource is configured as 128 or 256.

For still another example, when the frequency band is lower than or equal to 6 GHz, the sum of the quantity of contention-based random access preambles and the quantity of contention-free random access preambles in one random access resource may be configured as 64 or 128. When the frequency band is higher than 6 GHz, the sum of the quantity of contention-based random access preambles and the quantity of contention-free random access preambles in one random access resource may be configured as 128 or 256.

For yet another example, when the frequency band is lower than or equal to 6 GHz, the sum of the quantity of contention-based random access preambles and the quantity of contention-free random access preambles in one random access resource may be configured as 64 or 128. When the frequency band is higher than 6 GHz, the sum of the quantity of contention-based random access preambles and the quantity of contention-free random access preambles in one random access resource may be configured as 64 or 256.

A mapping relationship may be further preconfigured. For example, when the quantity of actually transmitted downlink signals associated with one random access resource is greater than a first preset threshold, the sum of the quantity of contention-based random access preambles and the quantity of contention-free random access preambles in one random access resource is 128. When the quantity of actually transmitted downlink signals associated with one random access resource is less than or equal to a first preset threshold and greater than a second preset threshold, the sum of the quantity of contention-based random access preambles and the quantity of contention-free random access preambles in one random access resource is 256. When the quantity of actually transmitted downlink signals associated with one random access resource is less than or equal to a second preset threshold, the sum of the quantity of contention-based random access preambles and the quantity of contention-free random access preambles in one random access resource is 128.

For another example, when the quantity of actually transmitted downlink signals associated with one random access resource is greater than a first preset threshold, the sum of the quantity of contention-based random access preambles and the quantity of contention-free random access preambles in one random access resource is 128. When the quantity of actually transmitted downlink signals associated with one random access resource is less than or equal to a first preset threshold, the sum of the quantity of contention-based random access preambles and the quantity of contention-free random access preambles in one random access resource is 64.

For still another example, when the quantity of actually transmitted downlink signals associated with one random access resource is greater than a first preset threshold, the sum of the quantity of contention-based random access preambles and the quantity of contention-free random access preambles in one random access resource is 256. When the quantity of actually transmitted downlink signals associated with one random access resource is less than or equal to a first preset threshold, the sum of the quantity of contention-based random access preambles and the quantity of contention-free random access preambles in one random access resource is 64.

For yet another example, when the quantity of actually transmitted downlink signals associated with one random access resource is greater than a first preset threshold, the sum of the quantity of contention-based random access preambles and the quantity of contention-free random access preambles in one random access resource is 256. When the quantity of actually transmitted downlink signals associated with one random access resource is less than or equal to a first preset threshold, the sum of the quantity of contention-based random access preambles and the quantity of contention-free random access preambles in one random access resource is 128.

Further, the network device determines, based on the quantity of actually transmitted downlink signals, a quantity of bits occupied by the index of the quantity of actually transmitted downlink signals associated with one random access resource.

A quantity of indexes may be determined based on the quantity of actually transmitted downlink signals, and then a quantity of bits of the indexes may be determined. For example, in a case shown in Table 1, there are 16 indexes. In this case, 4 bits are used for indication. However, in a case shown in Table 2, there are eight indexes. In this case, 3 bits may be used for indication.

More specifically, the quantity of actually transmitted downlink signals associated with one random access resource may be any one of the following: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, and 64. It can be learned that the index of the quantity of actually transmitted downlink signals associated with one random access resource requires a maximum of 6 bits.

For example, when the quantity of actually transmitted downlink signals associated with one random access resource does not exceed 10, the index of the quantity of actually transmitted downlink signals associated with one random access resource may occupy 4 bits, which indicate 10 cases: 1, 2, 3, 4, 5, 6, 7, 8, 9, and 10. Alternatively, when the quantity of actually transmitted downlink signals associated with one random access resource does not exceed 11, the index of the quantity of actually transmitted downlink signals associated with one random access resource may occupy 4 bits, which indicate 11 cases: 1, 2, 3, 4, 5, 6, 7, 8, 9, 10, and 11.

It should be noted that there are a plurality of cases of an actually transmitted downlink signal associated with a random access resource. For example, (1) one actually transmitted downlink signal is associated with one random access resource, (2) a plurality of actually transmitted downlink signals are associated with one random access resource, (3) one actually transmitted downlink signal is associated with a plurality of random access resources, or (4) a plurality of actually transmitted downlink signals are associated with a plurality of random access resources.

An identifier bit may be allocated to each of the four cases. To be specific, one or more bits are used to indicate a manner in which the random access resource is associated with the actually transmitted downlink signal.

In some embodiments, one identifier may be shared in the two cases (1) and (2), and one identifier may be shared in the two cases (3) and (4). In this way, only 1 bit is used for indication, so that a resource is saved. To distinguish between (1) and (2) more specifically, a quantity of random access preambles associated with one actually transmitted downlink signal may be further used for determining. To be specific, different quantities of random access preambles associated with one actually transmitted downlink signal correspond to different cases. A similar method may be used to distinguish between (3) and (4). Alternatively, (1) and (2) or (3) and (4) are further distinguished based on the quantity of actually transmitted downlink signals associated with one random access resource. To be specific, quantities of actually transmitted downlink signals associated with one random access resource are different, and correspondingly, manners in which the random access resource is associated with the actually transmitted downlink signals are also different.

Further, the quantity of actually transmitted downlink signals associated with one random access resource may be determined based on the quantity of contention-based random access preambles and the quantity of contention-free random access preambles in one random access resource.

Examples are as follows:

When the sum of the quantity of contention-based random access preambles and the quantity of contention-free random access preambles in one random access resource is 64, the quantity of actually transmitted downlink signals associated with one random access resource may be any one of the following: 1, 2, 3, 4, 5, 6, 7, 8, 9, 10, 11, 12, 13, 14, 15, and 16.

When the sum of the quantity of contention-based random access preambles and the quantity of contention-free random access preambles in one random access resource is 128, the quantity of actually transmitted downlink signals associated with one random access resource may be any one of the following: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32.

When the sum of the quantity of contention-based random access preambles and the quantity of contention-free random access preambles in one random access resource is 256, the quantity of actually transmitted downlink signals associated with one random access resource may be any one of the following: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, and 64.

It should be noted that the index of the quantity of actually transmitted downlink signals associated with one random access resource is still determined based on the quantity of actually transmitted downlink signals.

A random access resource may be associated with an actually transmitted downlink signal in at least the following four manners:

In a first manner, one downlink signal is associated with one random access resource.

In a second manner, a plurality of downlink signals are associated with one random access resource.

In a third manner, one downlink signal is associated with a plurality of random access resources.

In a fourth manner, a plurality of downlink signals are associated with a plurality of random access resources.

The first two manners may be classified into one type, and the last two manners may be classified into one type. The network device may use 1 bit for indication. 1 bit may be occupied in the foregoing configuration information to indicate whether the network device uses the former type or the latter type. For example, 0 indicates the former type, and 1 indicates the latter type. When the former type is used, the quantity of random access preambles associated with one downlink signal may be further used to indicate whether the first manner or the second manner is used, or a quantity of downlink signals associated with one random access resource may be used to indicate whether the first manner or the second manner is used. For example, it is pre-specified that some quantities of random access preambles associated with one downlink signal correspond to the first manner, and the other quantities of random access preambles associated with the downlink signal correspond to the second manner.

When the latter type is used, a similar manner may be used to distinguish between the third manner and the fourth manner. Details are not described herein again. To be specific, the quantity of random access preambles associated with one downlink signal may be further used to indicate whether the third manner or the fourth manner is used, or a quantity of downlink signals associated with one random access resource may be used to indicate whether the third manner or the fourth manner is used.

Similarly, the network device determines, based on the quantity of random access preambles transmitted on one random access resource, a quantity of bits in the configuration information that are occupied by an index of the quantity of contention-based random access preambles transmitted on one random access resource.

For example, the quantity of random access preambles transmitted on one random access resource is any one of the following: 64, 128, and 256. Correspondingly, the index of the quantity of contention-based random access preambles transmitted on one random access resource occupies 4 bits, which may indicate one or more of the following: 4×k1, 8×k1, and 16×k1, where k1 is an integer ranging from 1 to 16 (including 1 and 16).

Alternatively, when the quantity of random access preambles transmitted on one random access resource is 64, the index of the quantity of contention-based random access preambles transmitted on one random access resource occupies 4 bits.

Alternatively, when the quantity of random access preambles transmitted on one random access resource is 128, the index of the quantity of contention-based random access preambles transmitted on one random access resource occupies 5 bits, which may indicate the following: 4×k2, where k2 is an integer ranging from 1 to 32 (including 1 and 32). (This corresponds to the 5G standard proposal: Number of preambles for CBRA per RO: 5 bits).

Alternatively, when the quantity of random access preambles transmitted on one random access resource is 256, the index of the quantity of contention-based random access preambles transmitted on one random access resource occupies 5 bits, which may indicate one or more of the following: 8×k2, 4×k1, and 16×k1. Alternatively, the index of the quantity of contention-based random access preambles transmitted on one random access resource occupies 4 bits, which may indicate the following: 8×k2.

In some embodiments, the quantity of contention-based random preambles in one random access resource may be indicated based on the quantity of random access preambles in one random access resource. For example, when the quantity of random access preambles in one random access resource is 64, 4 bits may be used to indicate that the quantity of contention-based random preambles in one random access resource is 4×k1, where k1 is an integer ranging from 1 to 16 (including 1 and 16). Alternatively, the quantity may be represented as 4, 8, 12, 16, 20, 24, 28, 32, 36, 40, 44, 48, 52, 56, 60, or 64.

For example, when the quantity of random access preambles in one random access resource is 128, 4 bits may be used to indicate that the quantity of contention-based random preambles in one random access resource is 8×k1, or may be represented as 8, 16, 24, 32, 40, 48, 56, 64, 72, 80, 88, 96, 104, 112, 120, or 128.

Alternatively, 5 bits may be used to indicate that the quantity of contention-based random preambles in one random access resource is 4×k2, which is expanded to 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, or 128.

For example, when the quantity of random access preambles in one random access resource is 256, 4 bits may be used to indicate that the quantity of contention-based random preambles in one random access resource is 16×k1, which may be expansively represented as 16, 32, 48, 64, 80, 96, 112, 128, 144, 160, 176, 192, 208, 224, 240, or 256.

Alternatively, 5 bits may be used to indicate that the quantity of contention-based random preambles in one random access resource is 8×k2, or may be 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, or 256.

Alternatively, 6 bits may be used to indicate that the quantity of contention-based random preambles in one random access resource is 4×k3, where k3 is an integer ranging from 1 to 64 (including 1 and 64). 4×k3 may be expanded to 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, 128, 132, 136, 140, 144, 148, 152, 156, 160, 164, 168, 172, 176, 180, 184, 188, 192, 198, 200, 204, 208, 212, 216, 220, 224, 228, 232, 236, 240, 244, 248, 252, or 256.

Correspondingly, a quantity of random access preambles associated with one actually transmitted downlink signal may be floor (M1/N1). The quantity of contention-based random access preambles transmitted on one random access resource is M1, and the quantity of actually transmitted downlink signals associated with one random access resource is N1. Both M1 and N1 are integers greater than 0. floor represents rounding down.

Alternatively, A=floor (M1/N1), and B=M1 mod N1. A quantity of random access preambles associated with first B actually transmitted downlink signals in a time sequence is A+1, or a quantity of random access preambles associated with last B actually transmitted downlink signals in a time sequence is A+1. A quantity of random access preambles associated with the other actually transmitted downlink signals is A.

In some embodiments, the network device determines, based on the quantity of actually transmitted downlink signals associated with one random access resource, a quantity of bits in the configuration information that are occupied by an index of the quantity of random access preambles associated with one downlink signal.

Similar to that in the foregoing embodiment, a quantity of bits occupied by the index may be finally determined based on a possible index quantity.

Further, based on S203 and S204, the terminal may further determine an association relationship between a random access preamble quantity and a random access resource, an association relationship between a random access resource and an actually transmitted downlink signal, and an association relationship between "a random access preamble quantity and an actually transmitted downlink signal" and a random access resource based on the configuration information.

Then, the terminal may determine a target random access resource based on an actually transmitted downlink signal and the association relationship between a random access resource and an actually transmitted downlink signal, and send the random access preamble to the network device with reference to the association relationship between a random access preamble quantity and a random access resource by using the target random access resource.

In an implementation, the quantity of actually transmitted downlink signals associated with one random access resource may be determined based on the quantity of actually transmitted downlink signal groups associated with one random access resource.

In specific implementation, all actually transmitted downlink signals in one actually transmitted downlink signal group are associated with one random access resource.

In some embodiments, one random access resource is associated with a maximum of eight downlink signals.

If a quantity of actually transmitted downlink signals in one actually transmitted downlink signal group is less than or equal to a third preset threshold L, all the actually transmitted downlink signals in one actually transmitted downlink signal group are associated with one random access resource. L is an integer greater than 0.

If a quantity of actually transmitted downlink signals in one actually transmitted downlink signal group is greater than a third preset threshold L, L actually transmitted downlink signals in one actually transmitted downlink signal group are associated with one random access resource.

More specifically, downlink signals with specified index numbers in one actually transmitted downlink signal group are associated with a same random access resource. To be specific, specific index numbers of one or more downlink signals may be directly configured, and the downlink signals corresponding to these index numbers are associated with a same random access resource.

A remaining actually transmitted downlink signal may be associated with another random access resource. Details are not described herein.

Alternatively, when downlink signals in all actually transmitted downlink signal groups are separately numbered with index numbers, downlink signals with a same index number in all the actually transmitted downlink signal groups may be associated with a same random access resource.

Figure 3:
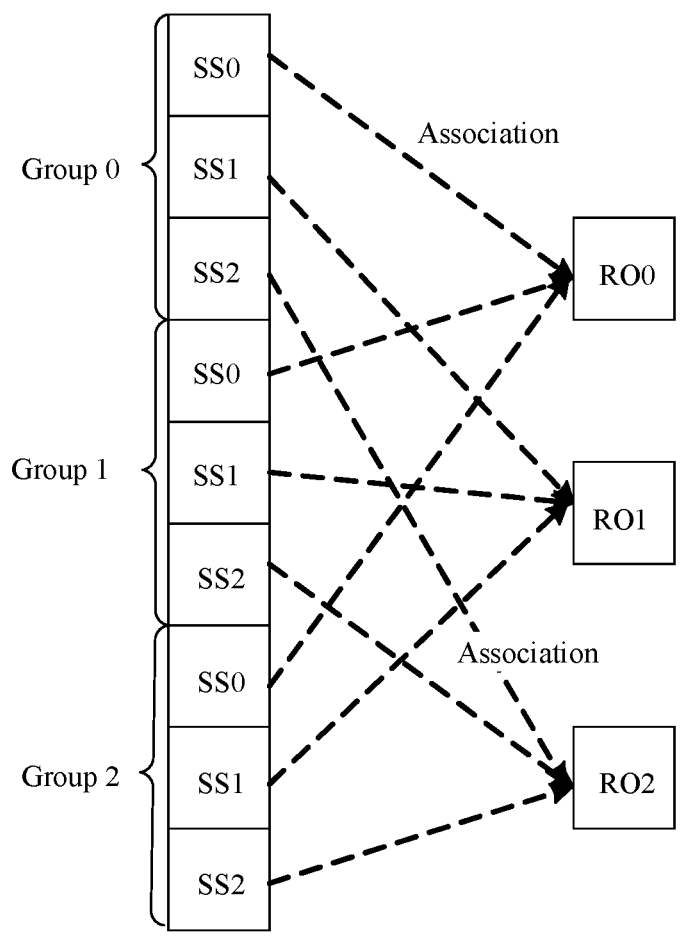
FIG. 3 is a schematic diagram of an association relationship according to some embodiments of this application.

FIG. 3 is a schematic diagram of an association relationship according to an embodiment of this application.

For example, index numbers of actually transmitted downlink signals in each actually transmitted downlink signal group are 0 to a. a+1 is a quantity of actually transmitted downlink signals in the actually transmitted downlink signal group, and a is an integer greater than 0. As shown in FIG. 3, actually transmitted downlink signals with an index number 0 in all the actually transmitted downlink signal groups are associated with one random access resource, actually transmitted downlink signals with an index number 1 in all the actually transmitted downlink signal groups are associated with one random access resource, and so on. Details are not described again.

It should be noted that, when downlink signals with a same index number in all the actually transmitted downlink signal groups are associated with a same random access resource, there are the following cases:

If a quantity of downlink signals with the same index number in the actually transmitted downlink signal groups is greater than the third preset threshold L, downlink signals with the same index number in first L of the actually transmitted downlink signal groups are associated with a same random access resource based on an index number sequence.

If a quantity of downlink signals with the same index number in the actually transmitted downlink signal groups is less than or equal to the third preset threshold L, the downlink signals with the same index number in the actually transmitted downlink signal groups are associated with a same random access resource.

Alternatively, index numbers of the downlink signals associated with a same random access resource may be consecutive index numbers. For example, downlink signals whose index numbers are 0 to (L−1) are associated with a same random access resource.

Alternatively, index numbers of the downlink signals associated with a same random access resource may be inconsecutive index numbers. This is not limited in this application.

When the index numbers of the downlink signals associated with the same random access resource may be inconsecutive index numbers, the index numbers of the downlink signals associated with the same random access resource are evenly separated.

Based on the foregoing embodiment, when the index numbers of the downlink signals associated with the same random access resource are consecutive index numbers, there are the following cases:

(1) Quantities of actually transmitted downlink signals associated with all random access resources are the same.

Index numbers of actually transmitted downlink signals associated with the $i^{th}$ random access resource may be $i \times floor(W1/X1)$ to $(i+1) \times floor(W1/X1)-1$, where a quantity of actually transmitted downlink signals is W1, and a quantity of random access resources is X1. Both W1 and X1 are integers greater than 0.

For example, index numbers of actually transmitted downlink signals associated with the $0^{th}$ random access resource are 0, 1, 2 . . . .

(2) Based on an index sequence of random access resources, quantities of actually transmitted downlink signals associated with random access resources other than the last random access resource are the same.

A quantity of actually transmitted downlink signals associated with the last random access resource is greater than a quantity of actually transmitted downlink signals associated with another random access resource.

Specifically, the actually transmitted downlink signals associated with the last random access resource are W1 mod X1 more than the actually transmitted downlink signals associated with the another random access resource.

For example, index numbers of the actually transmitted downlink signals associated with the another random access resource are i×floor(W1/X1) to (i+1)×floor(W1/X1)−1. For example, index numbers of actually transmitted downlink signals associated with the $0^{th}$ random access resource are 0, 1, 2 . . . .

Index numbers of the actually transmitted downlink signals associated with the last random access resource are (X1−1)×floor(W1/X1) to W1−1.

(3) Based on an index sequence of random access resources, quantities of actually transmitted downlink signals associated with first K1 random access resources are greater than a quantity of actually transmitted downlink signals associated with another random access resource. K1 is an integer greater than 0.

For example, actually transmitted downlink signals associated with each of the first K1 random access resources are W1 mod X1 more than the actually transmitted downlink signals associated with the another random access resource.

Index numbers of the actually transmitted downlink signals associated with each of the first K1 random access resources are i×ceil(W1/X1) to (i+1)×ceil(W1/X1), where i is less than or equal to K1.

Index numbers of the actually transmitted downlink signals associated with the another random access resource are i×floor(W1/X1)+K1 to (i+1)×floor(W1/X1)−1+K1.

(4) Based on an index sequence of random access resources, quantities of actually transmitted downlink signals associated with random access resources other than the $0^{th}$ random access resource are the same.

Specifically, actually transmitted downlink signals associated with the $0^{th}$ random access resource are W1 mod X1 more than actually transmitted downlink signals associated with another random access resource.

Index numbers of the actually transmitted downlink signals associated with the $0^{th}$ random access resource are 0, 1, 2, . . . , and floor(W1/X1)+K1−1.

Index numbers of the actually transmitted downlink signals associated with the another random access resource are i×floor(W1/X1)+K1 to (i+1)×floor(W1/X1)+K1−1.

(5) Based on an index sequence of random access resources, quantities of actually transmitted downlink signals associated with last K1 random access resources are greater than a quantity of actually transmitted downlink signals associated with another random access resource. K1 is an integer greater than 0.

Actually transmitted downlink signals associated with each of the last K1 random access resources are W1 mod X1 more than the actually transmitted downlink signals associated with the another random access resource.

Index numbers of the actually transmitted downlink signals associated with each of the last K1 random access resources are i×floor(W1/X1) to (i+1)×floor(W1/X1), where i<X1−K1.

Index numbers of the actually transmitted downlink signals associated with the another random access resource are i×ceil(W1/X1)−X1+K1 to (i+1)×ceil(W1/X1)−1−X1+K1.

(6) A quantity of actually transmitted downlink signals associated with the last random access resource is less than a quantity of actually transmitted downlink signals associated with another random access resource.

The actually transmitted downlink signals associated with the last random access resource are one fewer than the actually transmitted downlink signals associated with the another random access resource.

Index numbers of the actually transmitted downlink signals associated with the last random access resource are (X1−1)×ceil(W1/X1) to W1−1.

Index numbers of the actually transmitted downlink signals associated with the another random access resource are i×ceil(W1/X1) to (i+1)×ceil(W1/X1)−1.

(7) A quantity of actually transmitted downlink signals associated with the $0^{th}$ random access resource is less than a quantity of actually transmitted downlink signals associated with another random access resource.

Index numbers of the actually transmitted downlink signals associated with the $0^{th}$ random access resource are 0, 1, 2, . . . , and ceil(W1/X1)−K1−1.

Index numbers of the actually transmitted downlink signals associated with the another random access resource are i×ceil(W1/X1)−K1 to (i+1)×ceil(W1/X1)−K1−1.

Alternatively, when the index numbers of the downlink signals associated with the same random access resource are inconsecutive index numbers, there are the following cases:

(1) A specific index number of an actually transmitted downlink signal associated with each random access resource may be configured.

For example, index numbers of actually transmitted downlink signals associated with the $i^{th}$ random access resource are i, i+X2, i+2X2 . . . . X2 may be equal to X1, and X1 is a quantity of random access resources. X2 is an integer greater than 0. Alternatively, X2 is not equal to X1, and X2 may be any integer from 1 to 64 (including 1 and 64).

(2) A specific index number of an actually transmitted downlink signal associated with each random access resource may be configured in a calculation manner.

For example, for a to-be-grouped random access preamble index q, if q mod X2=i, it indicates that the $q^{th}$ actually transmitted downlink signal is associated with the $i^{th}$ random access resource. q is an integer greater than 0.

Alternatively, another grouping formula may be used. For example, for a to-be-grouped random access preamble index q, if q mod X2=i, it indicates that the $q^{th}$ random access preamble index is mapped to the $i^{th}$ actually transmitted downlink signal. A value of X2 may be configured by the network device, or may be fixed. When the value of X2 is fixed, X2 is a quantity of random access resources.

In an embodiment, when the configuration information indicates the quantity of random access preambles transmitted on one random access resource, it is assumed that the quantity of random access preambles transmitted on one random access resource is P. P is an integer greater than 0.

For example, a value 64, 128, or 256 of P is carried. This is not limited herein.

In addition, other than a manner in which the network device indicates P by using the configuration information, a fixed value of P may be preconfigured. Alternatively, a value of P is specified by using a protocol. This is not limited in this application.

In another embodiment, the configuration information does not directly indicate the quantity of random access preambles transmitted on one random access resource.

When the configuration information indicates the quantity of random access preambles associated with one downlink signal, a field in the configuration information identifies a quantity k1 of random access preambles associated with one actually transmitted downlink signal, where k1 is an integer greater than 0.

The terminal may further determine, based on the quantity of random access preambles associated with one downlink signal, the quantity of random access preambles transmitted on one random access resource.

Specifically, each actually transmitted downlink signal group is associated with k1 random access preambles, and the terminal may learn of P=m1×k1 based on a quantity m1 of actually transmitted downlink signal groups associated with each random access resource. m1 is an integer greater than 0.

In another implementation, configuration is performed based on a quantity of all actually transmitted downlink signals. The configuration information indicates a quantity k2 of random access preambles associated with one actually transmitted downlink signal, where k2 is an integer greater than 0.

Specifically, the terminal may determine P=n2×k2 based on k2 indicated by the configuration information and a quantity n2 of actually transmitted downlink signals associated with each random access preamble, where n2 is an integer greater than 0.

In still another implementation, the configuration information indicates a random access preamble parameter k3 and a multiple factor n3, where k3 and n3 are integers greater than 0. The terminal may determine P=n3×k3 based on k3 and n3.

In yet another implementation, P is configured based on a quantity of actually transmitted downlink signal groups and a quantity of actually transmitted downlink signals included in each actually transmitted downlink signal group.

The configuration information indicates a quantity k4 of random access preambles associated with one actually transmitted downlink signal, where k4 is an integer greater than 0. The terminal determines P=m2×n4×k4 based on a quantity m2 of downlink signal groups associated with one random access resource, a quantity n4 of actually transmitted downlink signals included in one actually transmitted downlink signal group, and k4. m2, n4, and k4 are integers greater than 0.

In some embodiments, when the quantity of random access preambles associated with one random access resource (namely, the quantity of random access preambles transmitted on one random access resource) is configured, the quantity may be alternatively configured, in an index manner, together with the quantity of random access preambles associated with one downlink signal.

In a configuration method, the configuration information includes an index number of a set including a quantity of random access preambles transmitted on one random access resource and a quantity of random access preambles associated with one downlink signal. One index corresponds to one pair including a quantity of random access preambles transmitted on one random access resource and a quantity of random access preambles associated with one downlink signal.

If 5 bits in the configuration information are used to indicate an index number of a set including a quantity N_C of random access preambles transmitted on one random access resource and a quantity N_SS of random access preambles associated with one downlink signal, index number configuration may be shown in Table 3.

TABLE 3

| Index number | N_C | N_SS | | | | | | | | |
|---|---|---|---|---|---|---|---|---|---|---|
| 0 to 9 | 64 | 4 | 8 | 12 | 16 | 20 | 24 | 28 | 32 | 64 |
| 10 to 20 | 128 | 8 | 16 | 24 | 32 | 40 | 48 | 56 | 64 | 72 | 128 |
| 21 to 31 | 256 | 16 | 32 | 48 | 64 | 80 | 96 | 112 | 128 | 144 | 256 |

Index numbers in each row successively indicate a value of N_C and values in columns of N_SS. For example, an index number 0 represents (64, 4). In other words, the quantity N_C of random access preambles transmitted on one random access resource is 64, and the quantity N_SS of random access preambles associated with one downlink signal is 4. An index number 9 represents (64, 64). In other words, the quantity N_C of random access preambles transmitted on one random access resource is 64, and the quantity N_SS of random access preambles associated with one downlink signal is 64. The second row is similar. An index number 10 represents (128, 8). In other words, the quantity N_C of random access preambles transmitted on one random access resource is 128, and the quantity N_SS of random access preambles associated with one downlink signal is 8. By analogy, details are not described herein again.

If 6 bits in the configuration information are used to indicate an index number of a set including a quantity N_C of random access preambles transmitted on one random access resource and a quantity N_SS of random access preambles associated with one downlink signal, index number configuration may be shown in Table 4.

TABLE 4

| Index number | N_C | N_SS | | | | | | | | |
|---|---|---|---|---|---|---|---|---|---|---|
| 0 to 9 | 64 | 4 | 8 | 12 | 16 | 20 | 24 | 28 | 32 | 36 | 64 |
| 10 to 19 | 128 | 4 | 8 | 12 | 16 | 20 | 24 | 28 | 32 | 36 | 64 |
| 20 to 29 | 128 | 68 | 40 | 44 | 48 | 52 | 56 | 60 | 72 | 76 | 128 |
| 30 to 39 | 256 | 8 | 16 | 24 | 32 | 40 | 48 | 56 | 64 | 72 | 128 |
| 40 to 49 | 256 | 136 | 144 | 80 | 88 | 96 | 104 | 112 | 120 | 152 | 256 |

Similar to those in Table 3, index numbers in each row successively indicate a value of N_C and values in columns of N_SS. For example, an index number 0 represents (64, 4). In other words, the quantity N_C of random access preambles transmitted on one random access resource is 64, and the quantity N_SS of random access preambles associated with one downlink signal is 4. An index number 49 represents (256, 256). In other words, the quantity N_C of random access preambles transmitted on one random access resource is 256, and the quantity N_SS of random access preambles associated with one downlink signal is 256.

Based on the foregoing embodiment, random access preambles may also be grouped. It is assumed that P random access preambles are transmitted on one random access resource, the P random access preambles are grouped into t random access preamble groups, and each random access preamble group is associated with one downlink signal or one downlink signal group. For example, the P random access preambles associated with one random access resource are grouped into t groups. Correspondingly, one random access resource is associated with t downlink signals, or one random access resource is associated with t downlink signal groups. t is an integer greater than 0.

Quantities of random access preambles in all groups may be the same or may be different. This is not limited in this application. A quantity of random access preambles in each group may be preconfigured, for example, configured by using a protocol or through pre-negotiation, or may be configured by using the configuration information sent by the network device to the terminal. For example, the configuration information may further indicate group information of random access preambles. Alternatively, a quantity of random access preambles in each group may be configured by using other configuration information.

In an embodiment, quantities of random access preambles in all groups are the same, and a quantity of random access preambles in each group may be directly configured, or a calculation formula for a quantity of random access preambles in each group may be configured. In some embodiments, the quantity of random access preambles in each group is floor(P/M2).

In this embodiment, M2 represents any one of the following cases: a quantity of random access preamble groups, a quantity of actually transmitted downlink signal groups, and a quantity of actually transmitted downlink signals. M2 is an integer greater than 0.

In another embodiment, there may be the following plurality of cases in which quantities of random access preambles in all groups are different:

(1) Based on an index sequence of random access preamble groups, a quantity of random access preambles in the first random access preamble group is greater than a quantity of random access preambles in another random access preamble group.

A calculation formula may be indicated. For example, the quantity of random access preambles in the first random access preamble group is [floor(P/M2)]+(P mod M2), and the quantity of random access preambles in the another random access preamble group is floor(P/M2).

Alternatively, a quantity of random access preamble groups and a quantity of random access preambles in each random access preamble group are directly configured.

A quantity of random access preambles in one random access preamble group may be a quantity of random access preambles associated with one downlink signal.

For example, 64 random access preambles are grouped into three groups, and quantities of random access preambles in the random access preamble groups are 24, 20, and 20.

(2) Based on an index sequence of random access preamble groups, quantities of random access preambles in first t1 random access preamble groups are greater than a quantity of random access preambles in another random access preamble group.

A calculation formula may be indicated. For example, a quantity of random access preambles in each of the first t1 random access preamble groups is floor(P/M2)+1, and the quantity of random access preambles in the another random access preamble group is floor(P/M2). t1 is an integer greater than or equal to 1. In some embodiments, t1 may be equal to P mod M2.

Alternatively, a quantity of random access preamble groups and a quantity of random access preambles in each random access preamble group are directly configured.

For example, 64 random access preambles are grouped into five groups, and quantities of random access preambles in the random access preamble groups are 13, 13, 13, 13, and 12.

(3) Based on an index sequence of random access preamble groups, a quantity of random access preambles in the last random access preamble group is greater than a quantity of random access preambles in another random access preamble group.

A calculation formula may be indicated. For example, the quantity of random access preambles in the last random access preamble group is [floor(P/M2)]+(P mod M2), and the quantity of random access preambles in the another random access preamble group is floor(P/M2).

Alternatively, a quantity of random access preamble groups and a quantity of random access preambles in each random access preamble group are directly configured.

For example, 64 random access preambles are grouped into three groups, and quantities of random access preambles in the random access preamble groups are 20, 20, and 24.

(4) Based on an index sequence of random access preamble groups, quantities of random access preambles in last t1 random access preamble groups are greater than a quantity of random access preambles in another random access preamble group.

A calculation formula may be indicated. For example, a quantity of random access preambles in each of the last t1 random access preamble groups is floor(P/M2)+1, and the quantity of random access preambles in the another random access preamble group is floor(P/M2). t1 is an integer greater than or equal to 1. In some embodiments, t1 may be equal to P mod M2.

Alternatively, a quantity of random access preamble groups and a quantity of random access preambles in each random access preamble group are directly configured.

For example, 64 random access preambles are grouped into five groups, and quantities of random access preambles in the random access preamble groups are 12, 13, 13, 13, and 13.

In this embodiment, M2 represents any one of the following cases: a quantity of random access preamble groups, a quantity of actually transmitted downlink signal groups, and a quantity of actually transmitted downlink signals. M2 is an integer greater than 0.

In some embodiments, some random access preambles may be grouped. For example, P random access preambles are classified into two types. A first type includes R random access preambles, a second type includes Q random access preambles, and P=Q+R. The R random access preambles in the P random access preambles are grouped into t' groups, and the remaining Q random access preambles are not grouped. Alternatively, the Q random access preambles are grouped into t' groups, and the remaining R random access preambles are not grouped. The first type of random access preambles may be independent of or may be associated with the second type of random access preambles. This is not limited in this application.

t', R, and Q are integers greater than 0, and R and Q are less than P. One or two of values of P, Q, and R may be flexibly configured, or may be a specified fixed value or specified fixed values.

In an implementation, the first type of random access preambles may be applied to a contention-free random access process, for example, connected-mode (RRC) tracking area (TA) restoration, connected-mode resource requesting, or other system information (OSI) requesting.

In some embodiments, the second type of random access preambles is applied to a contention-free random access process. The first type of random access preambles may be grouped.

Similar to those in the foregoing embodiment, quantities of random access preambles in all random access preamble groups may be the same or may be different. This is not limited in this application.

A quantity of random access preambles in each group may be preconfigured, for example, configured by using a protocol or through pre-negotiation, or may be configured by using the configuration information sent by the network device to the terminal. For example, the configuration information may further indicate group information of random access preambles. Alternatively, a quantity of random access preambles in each group may be configured by using other configuration information.

In an embodiment, quantities of random access preambles in all groups are the same, and a quantity of random access preambles in each group may be directly configured, or a calculation formula for a quantity of random access preambles in each group may be configured. In some embodiments, the quantity of random access preambles in each group is floor(R/M2).

In this embodiment, M2 represents any one of the following cases: a quantity of random access preamble groups, a quantity of actually transmitted downlink signal groups, and a quantity of actually transmitted downlink signals. M2 is an integer greater than 0.

In another embodiment, there may be the following plurality of cases in which quantities of random access preambles in all groups are different:

(1) Based on an index sequence of random access preamble groups, a quantity of random access preambles in the first random access preamble group is greater than a quantity of random access preambles in another random access preamble group.

A calculation formula may be indicated. For example, the quantity of random access preambles in the first random access preamble group is [floor(R/M2)]+(R mod M2), and the quantity of random access preambles in the another random access preamble group is floor(R/M2).

Alternatively, a quantity of random access preamble groups and a quantity of random access preambles in each random access preamble group are directly configured.

For example, 59 random access preambles of the first type are grouped into three groups, and quantities of random access preambles in the random access preamble groups are 23, 18, and 18.

(2) Based on an index sequence of random access preamble groups, quantities of random access preambles in first t1 random access preamble groups are greater than a quantity of random access preambles in another random access preamble group.

A calculation formula may be indicated. For example, a quantity of random access preambles in each of the first t1 random access preamble groups is floor(R/M2)+1, and the quantity of random access preambles in the another random access preamble group is floor(R/M2). t1 is an integer greater than or equal to 1. In some embodiments, t1 may be equal to R mod M2.

Alternatively, a quantity of random access preamble groups and a quantity of random access preambles in each random access preamble group are directly configured.

For example, 59 random access preambles of the first type are grouped into three groups, and quantities of random access preambles in the random access preamble groups are 20, 20, and 19.

(3) Based on an index sequence of random access preamble groups, a quantity of random access preambles in the last random access preamble group is greater than a quantity of random access preambles in another random access preamble group.

A calculation formula may be indicated. For example, the quantity of random access preambles in the last random access preamble group is [floor(R/M2)]+(R mod M2), and the quantity of random access preambles in the another random access preamble group is floor(R/M2).

Alternatively, a quantity of random access preamble groups and a quantity of random access preambles in each random access preamble group are directly configured.

For example, 59 random access preambles of the first type are grouped into three groups, and quantities of random access preambles in the random access preamble groups are 18, 18, and 23.

(4) Based on an index sequence of random access preamble groups, quantities of random access preambles in last t1 random access preamble groups are greater than a quantity of random access preambles in another random access preamble group.

A calculation formula may be indicated. For example, a quantity of random access preambles in each of the last t1 random access preamble groups is floor(R/M2)+1, and the quantity of random access preambles in the another random access preamble group is floor(R/M2). t1 is an integer greater than or equal to 1. In some embodiments, t1 may be equal to R mod M2.

Alternatively, a quantity of random access preamble groups and a quantity of random access preambles in each random access preamble group are directly configured.

For example, 59 random access preambles of the first type are grouped into three groups, and quantities of random access preambles in the random access preamble groups are 19, 20, and 20.

In this embodiment, M2 represents any one of the following cases: a quantity of random access preamble groups, a quantity of actually transmitted downlink signal groups, and a quantity of actually transmitted downlink signals. M2 is an integer greater than 0.

The quantity of random access preamble groups may be determined by an actually transmitted downlink signal or a random access downlink signal group. Certainly, the quantity of random access preamble groups may be alternatively configured by the network device, or the quantity of random access preamble groups is specified in a protocol. This is not limited in this application.

Random access preambles in each random access preamble group may not overlap those in another random access preamble group. In other words, a random access preamble in each random access preamble group is different from that in another random access preamble group. Alternatively, random access preambles in different random access preamble groups overlap. For example, a random access preamble may exist in a plurality of random access preamble groups.

It should be noted that the configuration information may be carried in any one of the following messages: a master information block (MIB), remaining minimum system information (RMSI), a new radio system information block 1 (NR-SIB 1), a new radio system information block 2 (NR-SIB 2), system information, downlink control information DCI), a radio resource control (RRC) message, and a media access control-control element (MAC-CE).

Based on the foregoing embodiment, the P random access preambles may be associated with an actually transmitted downlink signal or an actually transmitted downlink signal group.

In some embodiments, the network device sends association relationship configuration information to the terminal, and the association relationship configuration information indicates an association relationship between a random access preamble and an actually transmitted downlink signal, or the association relationship configuration information indicates an association relationship between a random access preamble and an actually transmitted downlink signal group.

The association relationship configuration information and the configuration information may be same configuration information. In other words, the configuration information also indicates the association relationship between a random access preamble and an actually transmitted downlink signal, and/or the association relationship between a random access preamble and an actually transmitted downlink signal group.

Certainly, the association relationship configuration information and the configuration information may alternatively be two different pieces of information. This is not limited herein.

Similarly, the association relationship configuration information may be carried in any one of the following messages: a master information block (MIB), remaining minimum system information (RMSI), a new radio system information block 1 (NR-SIB 1), a new radio system information block 2 (NR-SIB 2), system information, downlink control information (DCI), a radio resource control (RRC) message, and a media access control-control element (MAC-CE).

In some embodiments, random access preambles associated with each actually transmitted downlink signal are grouped into one group, or random access preambles associated with each actually transmitted downlink signal group are grouped into one group. It should be noted that grouping may be performed based on the foregoing quantity of random access preambles in the random access preamble group.

In a specific implementation process, random access preambles in a group may be consecutive or inconsecutive.

In an implementation, index numbers of the random access preambles associated with each actually transmitted downlink signal are consecutive, or index numbers of the random access preambles associated with each actually transmitted downlink signal group are consecutive. M3 represents a quantity of actually transmitted downlink signals, M4 represents a quantity of actually transmitted downlink signal groups, and M3 and M4 are integers greater than 0. Specifically, there are the following several cases:

(1) Quantities of random access preambles associated with all actually transmitted downlink signals are the same.

Index numbers of random access preambles associated with the $i^{th}$ actually transmitted downlink signal include: $i \times floor(P/M3)$ to $(i+1) \times floor(P/M3)-1$. For example, index numbers of random access preambles associated with the $0^{th}$ actually transmitted downlink signal are 0, 1, 2 . . . .

Similarly, quantities of random access preambles associated with all actually transmitted downlink signal groups are the same.

Index numbers of random access preambles associated with the $i^{th}$ actually transmitted downlink signal group include: $i \times floor(P/M4)$ to $(i+1) \times floor(P/M4)-1$. For example, index numbers of random access preambles associated with the $0^{th}$ actually transmitted downlink signal group are 0, 1, 2 . . . .

(2) Based on an index number of an actually transmitted downlink signal, a quantity of random access preambles associated with the last actually transmitted downlink signal is greater than a quantity of random access preambles associated with another actually transmitted downlink signal.

Specifically, in first M3−1 actually transmitted downlink signals, index numbers of random access preambles associated with the $i^{th}$ actually transmitted downlink signal are: $i \times floor(P/M3)$ to $(i+1) \times floor(P/M3)-1$. For example, index numbers of random access preambles associated with the $0^{th}$ actually transmitted downlink signal are 0, 1, 2 . . . . i is less than or equal to M3−1.

Index numbers of random access preambles associated with the last actually transmitted downlink signal are: $(M3-1) \times floor(P/M3)$ to $P-1$.

Similarly, based on an index number of an actually transmitted downlink signal group, a quantity of random access preambles associated with the last actually transmitted downlink signal group is greater than a quantity of random access preambles associated with another actually transmitted downlink signal group.

Specifically, in first M4−1 actually transmitted downlink signal groups, index numbers of random access preambles associated with the $i^{th}$ actually transmitted downlink signal group are: $i \times floor(P/M4)$ to $(i+1) \times floor(P/M4)-1$. For example, index numbers of random access preambles associated with the $0^{th}$ actually transmitted downlink signal group are 0, 1, 2 . . . .

Index numbers of random access preambles associated with the last actually transmitted downlink signal group are: $(M4-1) \times floor(P/M4)$ to $P-1$.

(3) Based on an index number of an actually transmitted downlink signal, quantities of random access preambles associated with first t1 actually transmitted downlink signals are greater than a quantity of random access preambles associated with another actually transmitted downlink signal. In some embodiments, t1 may be equal to P mod M3.

In the first t1 actually transmitted downlink signals, index numbers of random access preambles associated with the $i^{th}$ actually transmitted downlink signal are: $i \times ceil(P/M3)$ to $(i+1) \times ceil(P/M3)$, where i is less than or equal to t1, or i is less than 1.

In last M3−t1 actually transmitted downlink signals, index numbers of random access preambles associated with the $i^{th}$ actually transmitted downlink signal are: $i \times floor(P/M3)+P \bmod M3$ to $(i+1) \times floor(P/M3)-1+P \bmod M3$. i is greater than t1.

Similarly, based on an index number of an actually transmitted downlink signal group, quantities of random access preambles associated with first t2 actually transmitted downlink signal groups are greater than a quantity of random access preambles associated with another actually transmitted downlink signal group. In some embodiments, t2 may be equal to P mod M4.

In the first t2 actually transmitted downlink signal groups, index numbers of random access preambles associated with the $i^{th}$ actually transmitted downlink signal group are: $i \times ceil(P/M4)$ to $(i+1) \times ceil(P/M4)$, where i is less than or equal to t2.

In last M4−t2 actually transmitted downlink signal groups, index numbers of random access preambles associated with the $i^{th}$ actually transmitted downlink signal group are: $i \times floor(P/M4)+t2$ to $(i+1) \times floor(P/M4)-1+t2$. i is greater than t2.

(4) Based on an index number of an actually transmitted downlink signal, a quantity of random access preambles associated with the first actually transmitted downlink signal is greater than a quantity of random access preambles associated with another actually transmitted downlink signal. In addition, quantities of random access preambles associated with the other actually transmitted downlink signals may be the same.

Index numbers of random access preambles associated with the first actually transmitted downlink signal are: 0, 1, 2, ..., and floor(P/M3)+P mod M3−1.

In other downlink signals, index numbers of random access preambles associated with the $i^{th}$ actually transmitted downlink signal are: i×floor(P/M3)+P mod M3 to (i+1)×floor(P/M3)+P mod M3−1.

Similarly, based on an index number of an actually transmitted downlink signal group, a quantity of random access preambles associated with the first actually transmitted downlink signal group is greater than a quantity of random access preambles associated with another actually transmitted downlink signal group. In addition, quantities of random access preambles associated with the other actually transmitted downlink signal groups may be the same.

Index numbers of random access preambles associated with the first actually transmitted downlink signal group are: 0, 1, 2, ..., and floor(P/M4)+P mod M4−1.

In other downlink signal groups, index numbers of random access preambles associated with the $i^{th}$ actually transmitted downlink signal group are: i×floor(P/M4)+P mod M4 to (i+1)×floor(P/M4)+P mod M4−1.

(5) Based on an index number of an actually transmitted downlink signal, quantities of random access preambles associated with last t1 actually transmitted downlink signals are greater than a quantity of random access preambles associated with another actually transmitted downlink signal. In some embodiments, t1 may be equal to P mod M3.

In the last t1 actually transmitted downlink signals, index numbers of random access preambles associated with the $i^{th}$ downlink signal are: i×floor(P/M3) to (i+1)×floor(P/M3).

In first M3−t1 actually transmitted downlink signals, index numbers of random access preambles associated with the $i^{th}$ downlink signal are: i×ceil(P/M3)−M3+P mod M3 to (i+1)×ceil(P/M3)−1−X+P mod M3.

(6) Based on an index number of an actually transmitted downlink signal, a quantity of random access preambles associated with the last actually transmitted downlink signal is less than a quantity of random access preambles associated with another actually transmitted downlink signal. In addition, quantities of random access preambles associated with the other actually transmitted downlink signals may be the same.

Index numbers of random access preambles associated with the last actually transmitted downlink signal are: (M3−1)×ceil(P/M3) to P−1.

In first M3−1 actually transmitted downlink signals, index numbers of random access preambles associated with the $i^{th}$ downlink signal are: i×ceil(P/M3) to (i+1)×ceil(P/M3)−1.

Similarly, based on an index number of an actually transmitted downlink signal group, a quantity of random access preambles associated with the last actually transmitted downlink signal group is less than a quantity of random access preambles associated with another actually transmitted downlink signal group. In addition, quantities of random access preambles associated with the other actually transmitted downlink signal groups may be the same.

Index numbers of random access preambles associated with the last actually transmitted downlink signal group are: (M4−1)×ceil(P/M4) to P−1.

In first M4−1 actually transmitted downlink signal groups, index numbers of random access preambles associated with the $i^{th}$ downlink signal group are: i×ceil(P/M4) to (i+1)×ceil(P/M4)−1.

It should be noted that in the foregoing several manners, the index number of the random access preamble, the index number of the actually transmitted downlink signal, and the index number of the actually transmitted downlink signal group all start from 0.

(7) Based on an index number of an actually transmitted downlink signal, a quantity of random access preambles associated with the first actually transmitted downlink signal is less than a quantity of random access preambles associated with another actually transmitted downlink signal. In addition, quantities of random access preambles associated with the other actually transmitted downlink signals may be the same.

Indexes of random access preambles associated with the first actually transmitted downlink signal are: 0, 1, 2, ..., and ceil(P/M3)−P mod M3−1.

In other actually transmitted downlink signals, index numbers of random access preambles associated with the $i^{th}$ downlink signal are: i×ceil(P/M3)−P mod M3 to (i+1)×ceil(P/M3)−P mod M3−1.

Similarly, based on an index number of an actually transmitted downlink signal group, a quantity of random access preambles associated with the first actually transmitted downlink signal group is less than a quantity of random access preambles associated with another actually transmitted downlink signal group. In addition, quantities of random access preambles associated with the other actually transmitted downlink signal groups may be the same.

Indexes of random access preambles associated with the first actually transmitted downlink signal group are: 0, 1, 2, ..., and ceil(P/M4)−P mod M4−1.

In other actually transmitted downlink signal groups, index numbers of random access preambles associated with the $i^{th}$ downlink signal group are: i×ceil(P/M4)−P mod M4 to (i+1)×ceil(P/M4)−P mod M4−1.

In some embodiments, index numbers of contention-based random access preambles and contention-free random access preambles are consecutive. Contention-based random access preambles associated with one downlink signal are inconsecutive. For example, random access preambles are successively allocated to different downlink signals based on an index sequence. For example, indexes of random access preambles allocated to the $i^{th}$ downlink signal are H1 to H3. Random access preambles with indexes H1 to H2 are used as contention-based random access preambles. Random access preambles with indexes H2+1 to H3 are used as contention-based random access preambles. Indexes of random access preambles allocated to the $(i+1)^{th}$ downlink signal are H4 to H6. Random access preambles with indexes H4 to H5 are used as contention-based random access preambles. Random access preambles with indexes H5+1 to H6 are used as contention-based random access preambles. H6>H5>H4>H3>H2>H1, and H4=H3+1. In this case, contention-based random access preambles of different downlink signals are inconsecutive.

In some embodiments, contention-based random access preambles and contention-free random access preambles are consecutive, and contention-based random access preambles associated with one downlink signal are consecutive. For example, contention-based random access preambles are successively allocated to different downlink signals based on an index sequence. For example, indexes of contention-based random access preambles allocated to the $i^{th}$ downlink signal are H0 to H1, indexes of contention-based random access preambles allocated to the $(i+1)^{th}$ downlink signal are H1+1 to H2, and indexes of contention-based random access preambles allocated to the $(i+2)^{th}$ downlink signal are H2+1 to H3. H3>H2>H1>H0. Likewise, contention-free random access preambles associated with one downlink signal may also be consecutive. For example, contention-free random access preambles are successively allocated to different downlink signals based on an index sequence. For example, indexes of contention-free random access preambles allocated to the $i^{th}$ downlink signal are H0 to H1, indexes of contention-free random access preambles allocated to the $(i+1)^{th}$ downlink signal are H1+1 to H2, and indexes of contention-free random access preambles allocated to the $(i+2)^{th}$ downlink signal are H2+1 to H3. H3>H2>H1>H0.

H6, H5, H4, H3, H2, and H1 are all integers greater than 0.

In another implementation, index numbers of random access preambles associated with each actually transmitted downlink signal are inconsecutive, or index numbers of random access preambles associated with each actually transmitted downlink signal group are inconsecutive.

In some embodiments, the index numbers of the random access preambles associated with each actually transmitted downlink signal or the index numbers of the random access preambles associated with each actually transmitted downlink signal group may be directly configured.

For example, index numbers of random access preambles associated with the $i^{th}$ actually transmitted downlink signal are i, i+T, i+2T, . . . , and the like. T is an integer greater than 0. In some embodiments, T=M3, but is not limited thereto. T may alternatively be any integer from 1 to 64 (including 1 and 64).

Similarly, index numbers of random access preambles associated with the $i^{th}$ actually transmitted downlink signal group are i, i+T, i+2T, . . . , and the like. T is an integer greater than 0. In some embodiments, T=M4, but is not limited thereto. T may alternatively be any integer from 1 to 64 (including 1 and 64).

In some embodiments, a calculation formula for the index numbers of the random access preambles associated with each actually transmitted downlink signal or a calculation formula for the index numbers of the random access preambles associated with each actually transmitted downlink signal group may be further configured.

For example, for an index number K of a to-be-grouped random access preamble, if K mod M3=i, it indicates that the random access preamble K is associated with the $i^{th}$ downlink signal. Similarly, for an index number K of a to-be-grouped random access preamble, if K mod M4=i, it indicates that the random access preamble K is associated with the $i^{th}$ downlink signal group.

Alternatively, for an index number K of a to-be-grouped random access preamble, if K mod T=i, it indicates that the random access preamble K is associated with the $i^{th}$ actually transmitted downlink signal. Similarly, for an index number K of a to-be-grouped random access preamble, if K mod T=i, it indicates that the random access preamble K is associated with the $i^{th}$ actually transmitted downlink signal group. K starts from 0.

Alternatively, for a downlink signal, when i>P mod M3, index numbers of random access preambles associated with the $i^{th}$ actually transmitted downlink signal are i+N(1 to floor(P/N)). When i is less than or equal to P mod M3, index numbers of random access preambles associated with the $i^{th}$ actually transmitted downlink signal are i+N(1 to ceil(P/N)).

For a downlink signal group, when i>P mod M4, index numbers of random access preambles associated with the $i^{th}$ actually transmitted downlink signal group are i+N(1 to floor(P/N)). When i is less than or equal to P mod M4, index numbers of random access preambles associated with the $i^{th}$ actually transmitted downlink signal group are i+N(1 to ceil(P/N)).

In another implementation, index numbers of contention-based random access preambles and/or contention-free random access preambles associated with each actually transmitted downlink signal are inconsecutive.

When indexes of contention-based random access preambles and contention-free random access preambles are inconsecutive, there is the following case.

When contention-based random access preambles that are associated with J downlink signals and that are allocated by the network device are inconsecutive, allocation is performed based on J+1 downlink signals. Allocated indexes are (i−1), (i−1)+J+1, (i−1)+2(J+1) . . . . One random access resource is associated with the J downlink signals.

A downlink signal other than the J downlink signals is a virtual downlink signal. A contention-based random access preamble (preamble group) may be associated with the virtual downlink signal, or a contention-free random access preamble (preamble group) may be associated with the virtual downlink signal.

The J downlink signals associated with the contention-based random access preambles are considered as an entirety, and there is the other one virtual downlink signal. Therefore, there are a total of two downlink signals. For example, indexes of random access preambles associated with the $0^{th}$ virtual downlink signal are 0, 2, 4, 6, 8 . . . . Indexes of random access preambles associated with the $1^{st}$ virtual downlink signal are 1, 3, 5, 7, 9 . . . .

The virtual downlink signal may correspond to a CSI-RS, system information, or paging information. For example, when the random access preamble or the random access preamble group is used to associate with the CSI-RS, the CSI-RS is used as a virtual downlink signal. For another example, when the random access preamble or the random access preamble group is used to trigger/request the system information, the system information is used as a virtual downlink signal. For another example, when the random access preamble or the random access preamble group is used to trigger a paging message, the paging message is used as a virtual downlink signal.

In a random access preamble allocation method, indexes of contention-based random access preambles associated with one downlink signal are inconsecutive in a contention-based random access preamble set. Random access preambles are successively allocated to different downlink signals in sequence. For example, indexes of random access preambles allocated to the $i^{th}$ downlink signal are (i−1), (i−1)+J, (i−1)+2J . . . . A contention-based random access preamble (preamble group) may be associated with the virtual downlink signal, or a contention-free random access preamble (preamble group) may be associated with the virtual downlink signal.

Alternatively, indexes of contention-based random access preambles associated with one downlink signal are consecutive in a contention-based random access preamble set. For example, indexes of contention-based random access preambles allocated to the $i^{th}$ downlink signal are H0 to H1, indexes of contention-based random access preambles allocated to the $(i+1)^{th}$ downlink signal are H1+1 to H2, and indexes of contention-based random access preambles allocated to the $(i+2)^{th}$ downlink signal are H2+1 to H3. H3>H2>H1>H0.

Based on the foregoing embodiment, there are the following three cases for an association relationship between t random access preamble groups and M3 actually transmitted downlink signals:

(1) t=M3. In this case, one actually transmitted downlink signal is associated with one random access preamble group. This may be specifically configured by the network device by sending the configuration information to the terminal, or may be pre-specified in a protocol.

The actually transmitted downlink signals may be in a one-to-one correspondence with the random access preamble groups. In other words, each actually transmitted downlink signal has a dedicated random access preamble group.

(2) t<M3. In this case, a plurality of actually transmitted downlink signals are associated with one random access preamble group.

In a manner, an index number of a random access preamble group associated with the $i^{th}$ actually transmitted downlink signal is i mod t or floor(i/t).

For example, t=4, M3=7, an index number of a random access preamble group associated with the $0^{th}$ actually transmitted downlink signal is 0, and an index number of a random access preamble group associated with the $3^{rd}$ actually transmitted downlink signal is 0 or 3.

In another manner, a combination of actually transmitted downlink signals is preconfigured. For example, index numbers of actually transmitted downlink signals associated with a random access preamble group include y1, y2, . . . , and the like.

For example, t=3, M3=5, and a combination of index numbers of actually transmitted downlink signals may be [1/2, 3/4, 5], [1/2, 3, 4/5], [1, 2/3, 4/5], or the like.

Alternatively, some actually transmitted downlink signals may be associated with a random access preamble group of a next random access resource (an index number-based next random access resource).

The foregoing three manners may have different identifiers. The network device indicates a specific to-be-used association manner by adding an identifier of the association manner to the configuration information.

(3) t is greater than or equal to M3. In this case, one actually transmitted downlink signal may be associated with a plurality of random access preamble groups.

In a manner, the $i^{th}$ (i starts from 0) actually transmitted downlink signal is associated with a random access preamble group k. k is an index number of the random access preamble group, and i=k mod M3 or floor(k/M3).

In another manner, a combination of actually transmitted downlink signals is preconfigured. For example, index numbers of actually transmitted downlink signals associated with a random access preamble group include y1, y2, . . . , and the like.

For example, t=5, M3=3, and a combination of index numbers of actually transmitted downlink signals may be [1, 2, 3, 1, 2], [1, 2, 3, 2, 1], [1, 2, 3, 1, 3], [1, 2, 3, 3, 1], [1, 2, 3, 2, 3], or [1, 2, 3, 3, 2].

In still another manner, some random access preamble groups may be released. For example, a random access preamble group whose index number is greater than t is released, and remaining random access preamble groups are in a one-to-one correspondence with actually transmitted downlink signals. Herein, the releasing some random access preamble groups may be identifying the some random access preamble groups as unused.

The foregoing three manners may have different identifiers. The network device indicates a specific to-be-used association manner by adding an identifier of the association manner to the configuration information.

Similarly, there are the following three cases for an association relationship between t random access preamble groups and M4 actually transmitted downlink signal groups:

(1) t=M3×M4. In this case, one actually transmitted downlink signal group is associated with one random access preamble group. This may be specifically configured by the network device by sending the configuration information to the terminal, or may be pre-specified in a protocol.

The actually transmitted downlink signal groups may be in a one-to-one correspondence with the random access preamble groups. In other words, each actually transmitted downlink signal group has a dedicated random access preamble group.

(2) t<M3×M4. In this case, a plurality of actually transmitted downlink signal groups are associated with one random access preamble group.

In a manner, an index number of a random access preamble group associated with the $i^{th}$ actually transmitted downlink signal group is i mod t or floor(i/t).

For example, t=4, M3×M4=7, an index number of a random access preamble group associated with the $0^{th}$ actually transmitted downlink signal group is 0, and an index number of a random access preamble group associated with the $3^{rd}$ actually transmitted downlink signal group is 0 or 3.

In another manner, a combination of actually transmitted downlink signal groups is preconfigured. For example, index numbers of actually transmitted downlink signal groups associated with a random access preamble group include y1, y2, . . . , and the like.

For example, t=3, M3×M4=5, and a combination of index numbers of actually transmitted downlink signal groups may be [1/2, 3/4, 5], [1/2, 3, 4/5], [1, 2/3, 4/5], or the like.

Alternatively, some actually transmitted downlink signal groups may be associated with a random access preamble group of a next random access resource (an index number-based next random access resource).

The foregoing three manners may have different identifiers. The network device indicates a specific to-be-used association manner by adding an identifier of the association manner to the configuration information.

(3) t is greater than or equal to M3×M4. In this case, one actually transmitted downlink signal group may be associated with a plurality of random access preamble groups.

In a manner, the $i^{th}$ (i starts from 0) actually transmitted downlink signal group is associated with a random access preamble group k. k is an index number of the random access preamble group, and i=k mod (M3×M4) or floor(k/M3×M4).

For example, t=5, M3×M4=3, and a combination of index numbers of actually transmitted downlink signal groups may be [1, 2, 3, 1, 2], [1, 2, 3, 2, 1], [1, 2, 3, 1, 3], [1, 2, 3, 3, 1], [1, 2, 3, 2, 3], or [1, 2, 3, 3, 2].

In still another manner, some random access preamble groups may be released. For example, a random access preamble group whose index number is greater than t is released, and remaining random access preamble groups are in a one-to-one correspondence with actually transmitted downlink signal groups. Herein, the releasing some random access preamble groups may be identifying the some random access preamble groups as unused.

The foregoing three manners may have different identifiers. The network device indicates a specific to-be-used association manner by adding an identifier of the association manner to the configuration information.

In some embodiments, in a low frequency scenario, that is, a scenario in which a frequency band is lower than 6 GHz or a scenario in which a frequency band is lower than 3 GHz, it is assumed that M5 actually transmitted downlink signal groups are associated with t random access preamble groups.

(1) M5=t. In this case, one actually transmitted downlink signal group is associated with one random access preamble group. This may be specifically configured by the network device by sending the configuration information to the terminal, or may be pre-specified in a protocol.

The actually transmitted downlink signal groups may be in a one-to-one correspondence with the random access preamble groups. In other words, each actually transmitted downlink signal group has a dedicated random access preamble group.

(2) t<M5. In this case, a plurality of actually transmitted downlink signal groups are associated with one random access preamble group.

In a manner, an index number of a random access preamble group associated with the $i^{th}$ actually transmitted downlink signal group is i mod t or floor(i/t). i is an integer greater than 0.

For example, t=4, M5=7, an index number of a random access preamble group associated with the $0^{th}$ actually transmitted downlink signal group is 0, and an index number of a random access preamble group associated with the $3^{rd}$ actually transmitted downlink signal group is 0 or 3.

In another manner, a combination of actually transmitted downlink signal groups is preconfigured. For example, index numbers of actually transmitted downlink signal groups associated with a random access preamble group include y1, y2, . . . , and the like.

For example, t=3, M5=5, and a combination of index numbers of actually transmitted downlink signal groups may be [1/2, 3/4, 5], [1/2, 3, 4/5], [1, 2/3, 4/5], or the like.

Alternatively, some actually transmitted downlink signal groups may be associated with a random access preamble group of a next random access resource (an index number-based next random access resource).

The foregoing three manners may have different identifiers. The network device indicates a specific to-be-used association manner by adding an identifier of the association manner to the configuration information.

(3) t is greater than or equal to M5. In this case, one actually transmitted downlink signal group may be associated with a plurality of random access preamble groups.

In a manner, the $i^{th}$ (i starts from 0) actually transmitted downlink signal group is associated with a random access preamble group k. k is an index number of the random access preamble group, and i=k mod M5 or floor(k/M5).

In another manner, a combination of actually transmitted downlink signal groups is preconfigured. For example, index numbers of actually transmitted downlink signal groups associated with a random access preamble group include y1, y2, . . . , and the like.

For example, t=5, M5=3, and a combination of index numbers of actually transmitted downlink signal groups may be [1, 2, 3, 1, 2], [1, 2, 3, 2, 1], [1, 2, 3, 1, 3], [1, 2, 3, 3, 1], [1, 2, 3, 2, 3], or [1, 2, 3, 3, 2].

In still another manner, some random access preamble groups may be released. For example, a random access preamble group whose index number is greater than t is released, and remaining random access preamble groups are in a one-to-one correspondence with actually transmitted downlink signal groups. Herein, the releasing some random access preamble groups may be identifying the some random access preamble groups as unused.

The foregoing three manners may have different identifiers. The network device indicates a specific to-be-used association manner by adding an identifier of the association manner to the configuration information.

Based on the foregoing embodiment, there may be a plurality of association rules in one cell.

In some embodiments, in a first manner, each actually transmitted downlink signal group has an independent mapping manner, and association manners for downlink signals in each actually transmitted downlink signal group are the same.

A protocol may pre-specify a plurality of mapping rules, for example, two mapping rules. If there are N, such as four, actually transmitted SS block groups, N bits, for example, 4 bits such as 1010, may be used for indication. The $i^{th}$ actually transmitted SS block group may be indicated by using the $i^{th}$ bit, and i starts from 0.

Figure 4:
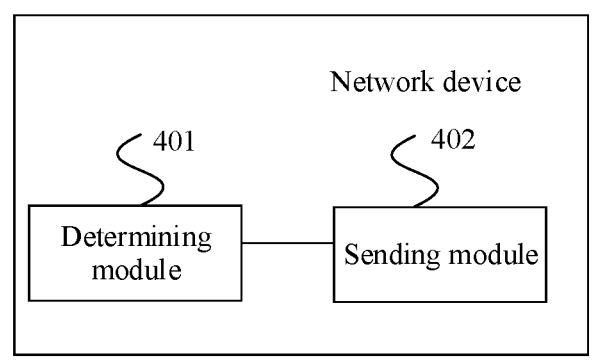
FIG. 4 is a schematic structural diagram of a network device according to some embodiments of this application.

FIG. 4 is a schematic structural diagram of a network device according to an embodiment of this application. As shown in FIG. 4, the network device includes a determining module 401 and a sending module 402.

The determining module 401 is configured to determine configuration information, where the configuration information is used to indicate at least one of the following: a quantity of random access preambles transmitted on one random access resource, a quantity of contention-based random access preambles transmitted on one random access resource, a quantity of contention-free random access preambles transmitted on one random access resource, a quantity of random access preambles associated with one downlink signal, a quantity of contention-free random access preambles associated with one downlink signal, a quantity of contention-based random access preambles associated with one downlink signal, and a quantity of actually transmitted downlink signals associated with one random access resource.

The sending module 402 is configured to send the configuration information to a terminal.

Some embodiments of the present disclosure are based on a same conception as the method embodiment, and technical effects brought by this embodiment of the present disclosure are also the same as those brought by the method embodiment. For a detailed process, refer to the description in the method embodiment. Details are not described herein again.

In some embodiments, the quantity of actually transmitted downlink signals associated with one random access resource is determined based on an actually transmitted downlink signal and/or an actually transmitted downlink signal group.

In some embodiments, when the configuration information indicates the quantity of actually transmitted downlink signals associated with one random access resource, the configuration information includes an index of the quantity of actually transmitted downlink signals associated with one random access resource.

In some embodiments, the determining module 401 is further configured to determine, based on a quantity of actually transmitted downlink signals, a quantity of bits occupied by the index of the quantity of actually transmitted downlink signals associated with one random access resource.

In some embodiments, the determining module 401 is further configured to determine, based on the quantity of actually transmitted downlink signals associated with one random access resource, a quantity of bits in the configuration information that are occupied by an index of the quantity of random access preambles associated with one downlink signal.

Figure 5:
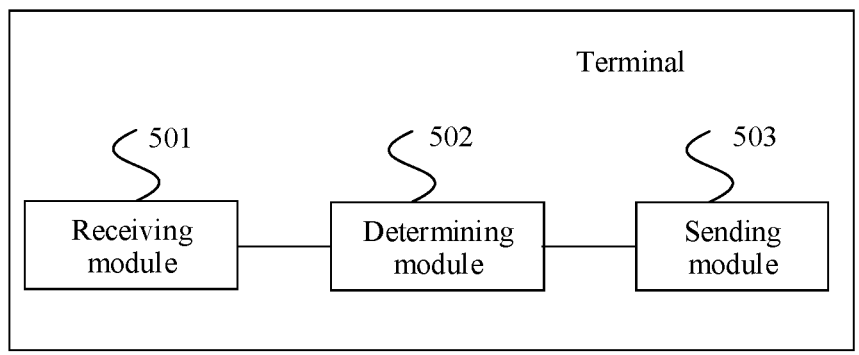
FIG. 5 is a schematic structural diagram of a terminal according to some embodiments of this application.

FIG. 5 is a schematic structural diagram of a terminal according to an embodiment of this application. As shown in FIG. 5, the terminal includes a receiving module 501, a determining module 502, and a sending module 503.

The receiving module 501 is configured to receive configuration information sent by a network device, where the configuration information is used to indicate at least one of the following: a quantity of random access preambles transmitted on one random access resource, a quantity of contention-based random access preambles transmitted on one random access resource, a quantity of contention-free random access preambles transmitted on one random access resource, a quantity of random access preambles associated with one downlink signal, a quantity of contention-free random access preambles associated with one downlink signal, a quantity of contention-based random access preambles associated with one downlink signal, and a quantity of actually transmitted downlink signals associated with one random access resource.

The determining module 502 is configured to determine, based on the configuration information, a random access resource associated with an actually transmitted downlink signal.

The sending module 503 is configured to send a random access preamble to the network device based on the random access resource associated with the actually transmitted downlink signal.

Some embodiments of the present disclosure are based on a same conception as the method embodiment, and technical effects brought by this embodiment of the present disclosure are also the same as those brought by the method embodiment. For a detailed process, refer to the description in the method embodiment. Details are not described herein again.

It should be noted and understood that the division into the modules of the foregoing apparatus is merely logical function division. During actual implementation, some or all modules may be integrated into one physical entity, or the modules may be physically separated. In addition, these modules may be all implemented in a form of software invoked by a processing element, or may be all implemented in a form of hardware; or some modules may be implemented in a form of software invoked by a processing element, and some modules are implemented in a form of hardware. For example, the determining module may be an independently disposed processing element, or may be integrated into a chip of the foregoing apparatus for implementation. Alternatively, the determining module may be stored in a memory of the foregoing apparatus in a form of program code, which is invoked and executed by a processing element of the foregoing apparatus. The foregoing apparatus may be configured to perform the method provided in the foregoing method embodiment. Specific implementations and technical effects are similar, and details are not described herein again.

For example, the foregoing modules may be configured as one or more integrated circuits implementing the foregoing method, for example, one or more application-specific integrated circuits (ASIC), one or more digital signal processors (DSPs), or one or more field programmable gate arrays (FPGAs). For another example, when a module is implemented in a form of program code invoked by a processing element, the processing element may be a general-purpose processor, for example, a central processing unit (CPU) or another processor that can invoke the program code. For another example, the modules may be integrated together, and implemented in a form of a system-on-a-chip (SOC), to implement functions of the modules. Implementations of the other modules are similar thereto. In addition, all or some of the modules may be integrated together, or may be implemented separately. The processing element herein may be an integrated circuit and has a signal processing capability. In an implementation process, steps in the foregoing method or the foregoing modules can be implemented by using a hardware integrated logical circuit in the processing element, or by using instructions in a form of software.

Figure 6:
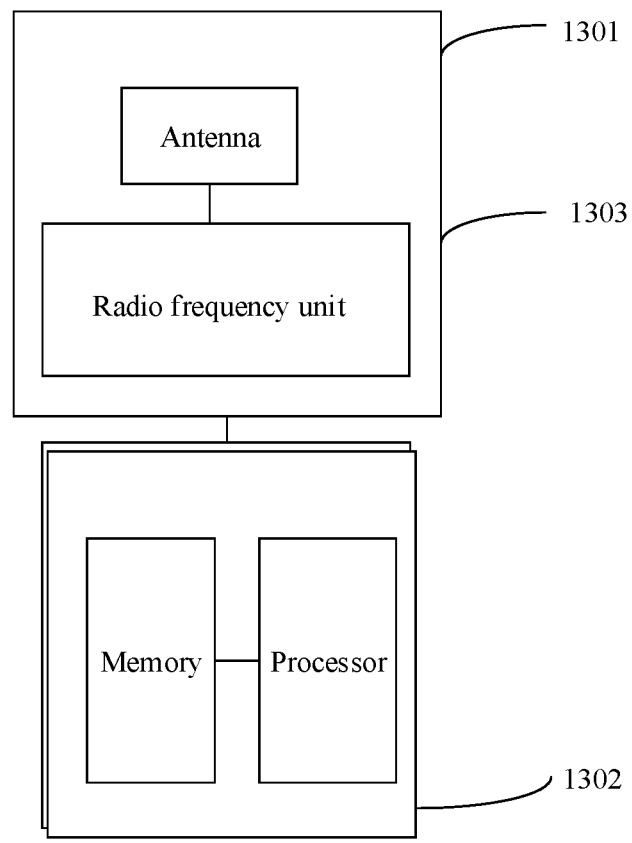
FIG. 6 is a schematic structural diagram of a network device according to some embodiments of this application.

FIG. 6 is a schematic structural diagram of a network device according to another embodiment of this application.

The network device includes a part 1302 and a part for sending/receiving a radio frequency signal and performing conversion. The part for sending/receiving a radio frequency signal and performing conversion further includes a receiving unit part 1301 and a sending unit part 1303 (which may also be collectively referred to as a transceiver unit). The part for receiving/sending a radio frequency signal and performing conversion is mainly configured to: send/receive a radio frequency signal and perform conversion between a radio frequency signal and a baseband signal. The part 1302 is mainly configured to perform baseband processing and control the network device.

The receiving unit 1301 may also be referred to as a receiver, a receiver circuit, or the like. The sending unit 1303 may also be referred to as a transmitter, a transmitter, a transmitter circuit, or the like. The part 1302 is usually a control center of the network device, may usually be referred to as a processing unit, and is configured to control the network device to perform steps performed by the network device in FIG. 2. For details, refer to descriptions of the foregoing related parts.

The part 1302 may include one or more boards. Each board may include one or more processors and one or more memories. The processor is configured to read and execute a program in the memory to implement a baseband processing function and control the network device. If there are a plurality of boards, the boards may be interconnected to improve a processing capability. In an optional implementation, a plurality of boards may share one or more processors, or a plurality of boards may share one or more memories, or a plurality of boards may simultaneously share one or more processors.

In another optional implementation, with development of a system-on-a-chip (SoC) technology, all or some functions of the parts 1302 and 1301 may be implemented by using the SoC technology, for example, implemented by using one network device function chip. The network device function chip integrates components such as a processor, a memory, and an antenna port. A program of a network device-related function is stored in the memory. The processor executes the program to implement the base station-related function. In some embodiments, the network device function chip can also read a memory outside the chip to implement the network device-related function.

In some embodiments, when all or a part of the random access method in the foregoing embodiment is implemented by using software, the terminal or the network device may alternatively include only a processor. A memory configured to store a program is located outside the apparatus. The processor is connected to the memory by using a circuit/wire, and is configured to read and execute the program stored in the memory.

The processor may be a central processing unit (CPU), a network processor (NP), or a combination of a CPU and an NP.

The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory, for example, a random access memory (RAM); or the memory may include a non-volatile memory, for example, a flash memory a hard disk drive (HDD), or a solid-state drive (SSD); or the memory may include a combination of the foregoing types of memories.

Figure 7:
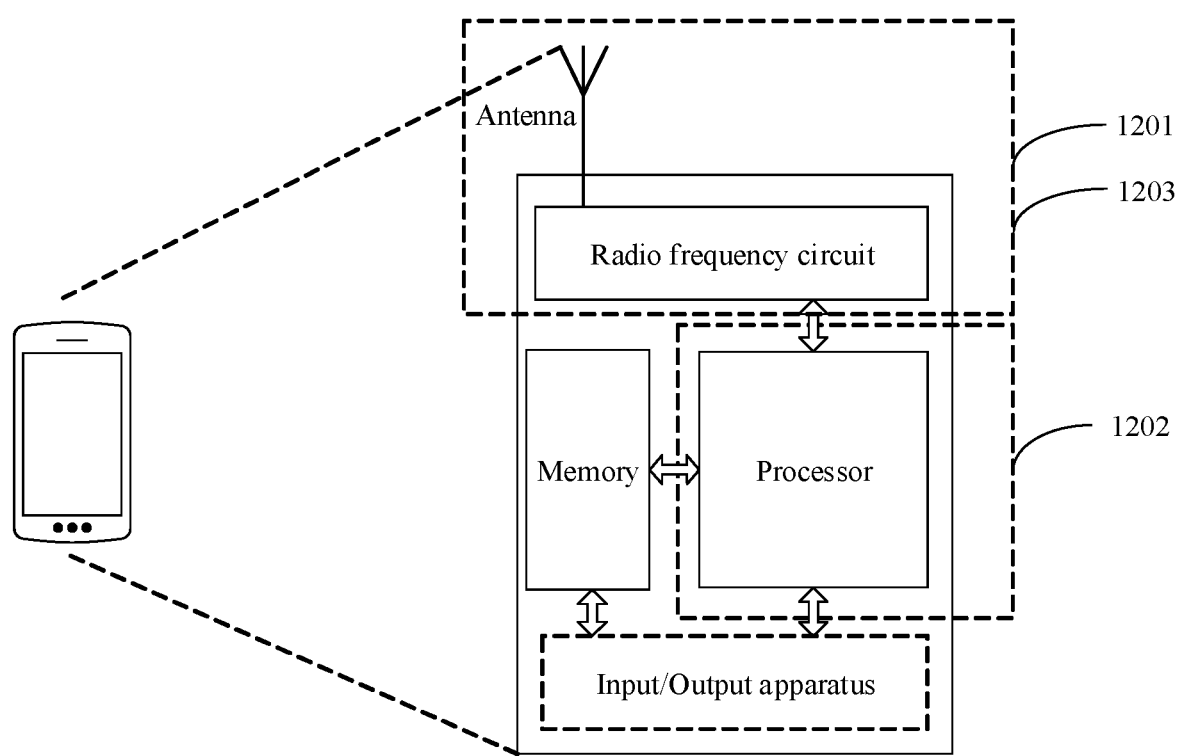
FIG. 7 is a schematic structural diagram of a simplified terminal device according to some embodiments of this application.

FIG. 7 is a schematic structural diagram of a simplified terminal device according to an embodiment of this application. For ease of understanding and illustration, an example in which the terminal device is a mobile phone is used in FIG. 7.

As shown in FIG. 7, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to transmit/receive a radio frequency signal in an electromagnetic wave form. The input/output apparatus, such as a touchscreen, a display, or a keyboard, is mainly configured to: receive data input by a user, and output data to the user. It should be noted that some types of terminal devices may have no input/output apparatus.

When data is sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 7 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiving function may be considered as a receiving unit and a sending unit (which may also be collectively referred to as a transceiver unit) of the terminal device, and the processor that has a processing function may be considered as a processing unit of the terminal device. As shown in FIG. 7, the terminal device includes a receiving unit 1201, a processing unit 1202, and a sending unit 1203. The receiving unit 1201 may also be referred to as a receiver, a receiver, a receiver circuit, or the like. The sending unit 1203 may also be referred to as a transmitter, a transmitter, a transmitter, a transmitter circuit, or the like. The processing unit may also be referred to as a processor, a processing board, a processing module, a processing apparatus, or the like.

An embodiment of this application further provides a computer storage medium storing a computer program, and the computer program is used to perform the random access method provided in the foregoing embodiment.

An embodiment of this application further provides a computer program product including an instruction. When the instruction is run on a computer, the computer is enabled to perform the random access method provided in the foregoing embodiment.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

What is claimed is:

1. A random access method, comprising:
   determining, by a network device, configuration information, wherein the configuration information includes an index of a quantity of transmitted downlink signals associated with one random access resource, each different index indicates a corresponding different quantity of transmitted downlink signals associated with the one random access resource, and the configuration information indicates at least:
  a quantity of random access preambles transmitted on the one random access resource,
  a quantity of contention-based random access preambles transmitted on the one random access resource,
  a quantity of contention-free random access preambles transmitted on the one random access resource,
  the quantity of random access preambles associated with one downlink signal,
  the quantity of contention-free random access preambles associated with the one downlink signal,
  the quantity of contention-based random access preambles associated with the one downlink signal, or
  the quantity of transmitted downlink signals associated with the one random access resource; and
sending, by the network device, the configuration information to a terminal.

2. The method according to claim 1, wherein the quantity of transmitted downlink signals associated with the one random access resource is determined based on at least one of a transmitted downlink signal or a group of transmitted downlink signals.

3. The method according to claim 1, wherein the configuration information comprises an index of the quantity of transmitted downlink signals associated with the one random access resource in response to the configuration information that indicates the quantity of transmitted downlink signals associated with the one random access resource.

4. The method according to claim 3, further comprising: determining, by the network device, a quantity of bits occupied by the index of the quantity of transmitted downlink signals associated with the one random access resource based on a quantity of transmitted downlink signals.

5. The method according to claim 1, further comprising: determining, by the network device, a quantity of bits in the configuration information that are occupied by an index of the quantity of contention-based random access preambles transmitted on the one random access resource based on the quantity of random access preambles transmitted on the one random access resource.

6. The method according to claim 1, further comprising: determining, by the network device, a quantity of bits in the configuration information that are occupied by an index of the quantity of random access preambles associated with the one downlink signal based on the quantity of transmitted downlink signals associated with the one random access resource.

7. The method according to claim 1, wherein indices of the random access preambles associated with the one downlink signal are inconsecutive random access preamble indices or consecutive random access preamble indices.

8. The method according to claim 1, wherein the configuration information indicates:
  the quantity of random access preambles transmitted on the one random access resource, the quantity of contention-free random access preambles associated with the one downlink signal, and the quantity of transmitted downlink signals associated with the one random access resource; or
  the quantity of contention-free random access preambles associated with the one downlink signal, and the quantity of transmitted downlink signals associated with the one random access resource.

9. A random access method, comprising:
receiving, by a terminal, configuration information from a network device, wherein the configuration information includes an index of a quantity of transmitted downlink signals associated with one random access resource, each different index indicates a corresponding different quantity of transmitted downlink signals associated with the one random access resource, and the configuration information indicates at least:
  a quantity of random access preambles transmitted on one random access resource,
  a quantity of contention-based random access preambles transmitted on the one random access resource,
  a quantity of contention-free random access preambles transmitted on the one random access resource,
  the quantity of random access preambles associated with one downlink signal,
  the quantity of contention-free random access preambles associated with the one downlink signal,
  the quantity of contention-based random access preambles associated with the one downlink signal, or
  the quantity of transmitted downlink signals associated with the one random access resource;
determining, by the terminal, a random access resource associated with a transmitted downlink signal based on the configuration information; and
sending, by the terminal, a random access preamble to the network device based on the random access resource associated with the transmitted downlink signal.

10. The method according to claim 9, wherein a quantity of bits occupied by the index of the quantity of transmitted downlink signals associated with the one random access resource is determined based on the quantity of transmitted downlink signals.

11. The method according to claim 9, wherein a quantity of bits in the configuration information that are occupied by an index of the quantity of contention-based random access preambles transmitted on the one random access resource is determined based on the quantity of random access preambles transmitted on the one random access resource.

12. The method according to claim 9, wherein a quantity of bits in the configuration information that are occupied by an index of the quantity of random access preambles associated with the one downlink signal is determined based on the quantity of transmitted downlink signals associated with the one random access resource.

13. A network device, comprising:
a processor, configured to determine configuration information, wherein the configuration information includes an index of a quantity of transmitted downlink signals associated with one random access resource, each different index indicates a corresponding different quantity of transmitted downlink signals associated with the one random access resource, and the configuration information indicates at least:
  a quantity of random access preambles transmitted on one random access resource,
  a quantity of contention-based random access preambles transmitted on the one random access resource,
  a quantity of contention-free random access preambles transmitted on the one random access resource,
  the quantity of random access preambles associated with one downlink signal,
  the quantity of contention-free random access preambles associated with the one downlink signal, the quantity of contention-based random access preambles associated with the one downlink signal, or the quantity of transmitted downlink signals associated with the one random access resource; and a transmitter, configured to send the configuration information to a terminal.

14. The network device according to claim 13, wherein the quantity of transmitted downlink signals associated with the one random access resource is determined based on at least one of a transmitted downlink signal or a group of transmitted downlink signals.

15. The network device according to claim 13, wherein the configuration information comprises an index of the quantity of transmitted downlink signals associated with the one random access resource in response to the configuration information that indicates the quantity of transmitted downlink signals associated with the one random access resource.

16. The network device according to claim 13, wherein the processor is further configured to determine a quantity of bits in the configuration information that are occupied by an index of the quantity of random access preambles associated with the one downlink signal based on the quantity of transmitted downlink signals associated with the one random access resource.

17. A terminal, comprising:
a receiver, configured to receive configuration information from a network device, wherein the configuration information includes an index of a quantity of transmitted downlink signals associated with one random access resource, each different index indicates a corresponding different quantity of transmitted downlink signals associated with the one random access resource, and the configuration information indicates at least:
a quantity of random access preambles transmitted on one random access resource,
a quantity of contention-based random access preambles transmitted on the one random access resource,
a quantity of contention-free random access preambles transmitted on the one random access resource,
the quantity of random access preambles associated with one downlink signal,
the quantity of contention-free random access preambles associated with the one downlink signal,
the quantity of contention-based random access preambles associated with the one downlink signal, or
the quantity of transmitted downlink signals associated with the one random access resource;
a processor, configured to determine a random access resource associated with a transmitted downlink signal based on the configuration information; and
a transmitter, configured to send a random access preamble to the network device based on the random access resource associated with the transmitted downlink signal.

18. The terminal according to claim 17, wherein the configuration information comprises the index of the quantity of transmitted downlink signals associated with the one random access resource in response to the configuration information that indicates the quantity of transmitted downlink signals associated with the one random access resource.

19. The terminal according to claim 17, wherein a quantity of bits in the configuration information that are occupied by an index of the quantity of random access preambles associated with the one downlink signal is determined based on the quantity of transmitted downlink signals associated with the one random access resource.

20. The terminal according to claim 17, wherein the configuration information indicates:
the quantity of random access preambles transmitted on the one random access resource, the quantity of contention-free random access preambles associated with the one downlink signal, and the quantity of transmitted downlink signals associated with the one random access resource; or
the quantity of contention-free random access preambles associated with the one downlink signal, and the quantity of transmitted downlink signals associated with the one random access resource.

* * * * *